US009752037B2

(12) United States Patent
Hakiri et al.

(10) Patent No.: US 9,752,037 B2
(45) Date of Patent: Sep. 5, 2017

(54) INKJET RECORDING INK, INK CARTRIDGE, INKJET RECORDING METHOD, INKJET RECORDING DEVICE AND INK RECORDED MATTER

(71) Applicants: Minoru Hakiri, Shizuoka (JP); Mitsuru Naruse, Shizuoka (JP); Masayasu Nonogaki, Shizuoka (JP); Keita Katoh, Shizuoka (JP); Akihiko Matsuyama, Shizuoka (JP); Kazukiyo Nagai, Shizuoka (JP); Yuusuke Koizuka, Shizuoka (JP); Masato Matsumura, Kyoto (JP); Takuya Furuta, Kyoto (JP)

(72) Inventors: Minoru Hakiri, Shizuoka (JP); Mitsuru Naruse, Shizuoka (JP); Masayasu Nonogaki, Shizuoka (JP); Keita Katoh, Shizuoka (JP); Akihiko Matsuyama, Shizuoka (JP); Kazukiyo Nagai, Shizuoka (JP); Yuusuke Koizuka, Shizuoka (JP); Masato Matsumura, Kyoto (JP); Takuya Furuta, Kyoto (JP)

(73) Assignees: Ricoh Company, Ltd., Tokyo (JP); GOO CHEMICAL CO., LTD., Uji-shi (JP)

(*) Notice: Subject to any disclaimer, the term of this patent is extended or adjusted under 35 U.S.C. 154(b) by 22 days.

(21) Appl. No.: 14/766,836

(22) PCT Filed: Feb. 27, 2014

(86) PCT No.: PCT/JP2014/055882
§ 371 (c)(1),
(2) Date: Aug. 10, 2015

(87) PCT Pub. No.: WO2014/142013
PCT Pub. Date: Sep. 18, 2014

(65) Prior Publication Data
US 2015/0376425 A1 Dec. 31, 2015

(30) Foreign Application Priority Data

Mar. 15, 2013 (JP) .................. 2013-053084
Mar. 15, 2013 (JP) .................. 2013-053093
Dec. 26, 2013 (JP) .................. 2013-269034

(51) Int. Cl.
C09D 11/30 (2014.01)
C09D 133/04 (2006.01)
(Continued)

(52) U.S. Cl.
CPC ............. *C09D 11/30* (2013.01); *B41J 2/2107* (2013.01); *C09D 11/107* (2013.01);
(Continued)

(58) Field of Classification Search
CPC ...................................... C09D 11/30
See application file for complete search history.

(56) References Cited

U.S. PATENT DOCUMENTS 6,433,117 B1  8/2002 Ma et al.
2005/0282932 A1 12/2005 Takizawa et al.
(Continued)

FOREIGN PATENT DOCUMENTS

EP   1 605 026 A1  12/2005
JP   61-023652      2/1986
(Continued)

OTHER PUBLICATIONS

Machine Translation of JP 2013-028658 (obtained Oct. 12, 2016).*
(Continued)

*Primary Examiner* — Gerard Higgins
*Assistant Examiner* — Sathavaram I Reddy
(74) *Attorney, Agent, or Firm* — Oblon, McClelland, Maier & Neustadt, L.L.P.

(57) ABSTRACT

An inkjet recording ink, including: water; a water-soluble organic solvent; a pigment; and a phosphate group-containing copolymer, wherein the phosphate group-containing copolymer contains a structural unit represented by the following General Formula (1) and a structural unit represented by the following General Formula (2): where R1 denotes a hydrogen atom or a methyl group; $M^+$ denotes an alkali metal ion, an organic amine ion, or a hydrogen ion; half or more of $M^+$ in the copolymer is the alkali metal ion or the organic amine ion, the remainder of $M^+$ is the hydrogen ion; n and m each denote an integer of 0 to 6, provided that both of n and m are not 0; and a block of $(C_2H_4O)$ and a block of $(C_3H_6O)$ may be exchanged with each other, where R2 denotes a hydrogen atom or a methyl group.

(Continued)

(1)

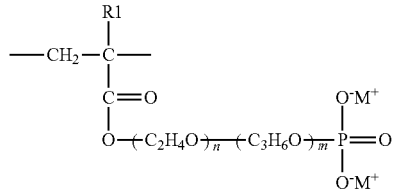

(2)

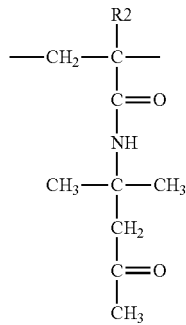

9 Claims, 4 Drawing Sheets

(51) Int. Cl.
| | | |
|---|---|---|
| B41J 2/21 | (2006.01) | |
| C09D 11/326 | (2014.01) | |
| C09D 133/14 | (2006.01) | |
| C09D 11/107 | (2014.01) | |
| C09D 143/02 | (2006.01) | |

(52) U.S. Cl.
CPC .......... C09D 11/326 (2013.01); C09D 133/14 (2013.01); C09D 143/02 (2013.01)

(56) References Cited

U.S. PATENT DOCUMENTS

| | | |
|---|---|---|
| 2007/0263050 A1 | 11/2007 | O'Donnell et al. |
| 2007/0263054 A1 | 11/2007 | Yatake et al. |
| 2008/0213550 A1 | 9/2008 | Watanabe |
| 2011/0205289 A1 | 8/2011 | Irita et al. |
| 2011/0242199 A1 | 10/2011 | Nishimura |
| 2012/0313997 A1 | 12/2012 | Nakazawa et al. |

FOREIGN PATENT DOCUMENTS

| | | |
|---|---|---|
| JP | 2000-129069 | 5/2000 |
| JP | 2007-070568 | 3/2007 |
| JP | 2007-099913 | 4/2007 |
| JP | 2007-513233 | 5/2007 |
| JP | 2007-191533 | 8/2007 |
| JP | 2007-270089 | 10/2007 |
| JP | 2008-144033 | 6/2008 |
| JP | 2010-065131 | 3/2010 |
| JP | 2010-189478 | 9/2010 |
| JP | 2011-122072 | 6/2011 |
| JP | 2011-174013 | 9/2011 |
| JP | 2011-207970 | 10/2011 |
| JP | 2011-208082 | 10/2011 |
| JP | 2013-028658 | 2/2013 |
| JP | 2013-194119 | 9/2013 |
| WO | WO 01/10918 A1 | 2/2001 |

OTHER PUBLICATIONS

Extended European Search Report issued on Feb. 18, 2016 in Patent Application No. 14763710.2.

International Search Report Issued Jun. 17, 2014 for counterpart International Patent Application No. PCT/JP2014/055882 filed Feb. 27, 2014.

\* cited by examiner

INKJET RECORDING INK, INK CARTRIDGE, INKJET RECORDING METHOD, INKJET RECORDING DEVICE AND INK RECORDED MATTER

TECHNICAL FIELD

The present invention relates to an inkjet recording ink, an ink cartridge, an inkjet recording method, an inkjet recording device, and an ink recorded matter.

BACKGROUND ART

In recent years, as an image formation method, an inkjet recording method has become popular because the inkjet recording method provides a simpler process and is easier to make a full-color image than other recording methods, and can provide a high-resolution image even with a simple device.

According to the inkjet recording method, a small amount of ink is jetted by foam generated by heat, or by pressure that is generated with the use of a piezoelectric or electrostatic force. The jetted ink is allowed to be adhered to a recording medium such as paper and then promptly dried or penetrated into the recording medium. In this manner, an image is formed. An application of the inkjet recording method has become widespread in various fields such as personal and industrial printers or printing.

For an inkjet recording device, an aqueous ink containing a water-soluble dye as a color material (a dye ink) is mainly used. However, the dye ink is disadvantageously poor in weather resistance and water resistance. Therefore, in recent years, a pigment ink containing a pigment instead of the water-soluble dye has been researched.

However, the pigment ink is poorer in color-developability, ink ejection stability, and storage stability than the dye ink. As the high-quality image technology for OA printers has advanced, higher image density is increasingly required even when recording is performed on plain paper with the pigment ink. However, in the case where the plain paper is used, there has been a problem that the pigment ink penetrates into the paper, resulting in a decrease in the pigment concentration on the paper surface and a drop in image density.

In recent years, in particular, a demand for industrial applications has been growing, and high-speed printing has been desired. For the high-speed printing, an inkjet printer equipped with a line head has been proposed. In the case of the high-speed printing, in order to accelerate the drying speed of the ink which has adhered to the recording medium, a penetrating agent is added to the ink to thereby allow water to penetrate into the recording medium. However, in this case, in addition to water, the pigment also penetrates into the recording medium in a high degree. As a result, the image density further decreases, which is problematic.

In the case of the plain paper, immediately after printing, water serving as an ink solvent makes a surface of the plain paper to swell, so that a difference between extension rates on a front surface and a back surface is increased to cause curling. This curling phenomenon has not been problematic in low-speed printing because it is eliminated as water is gradually dried. However, in the high-speed printing, the recording medium must be conveyed after printing in a state in which curling still remains thereon, which causes paper jam. An increase of an amount of a water-soluble organic solvent contained in the ink is effective for the curling, but, as a result, the ink is allowed to be more hydrophobic, making it difficult to ensure storage stability of the ink.

PTL 1 describes an ink containing an aqueous solvent, a pigment, a water-insoluble polymer dispersing agent, and a self-dispersing polymer which is excellent in ink ejection property and blocking resistance of an image. In addition, as a monomer of the water-insoluble polymer, a phosphate group-containing monomer is described. However, neither a copolymer containing a monomer represented by General Formula (5) of the present invention, nor its effects of improving dispersibility of the self-dispersing polymer and image density has been described.

PTL 2 describes a UV-curable white ink composition for inkjet recording which contains a while pigment, and a vinyl polymer containing a terminal substituent of an acid or salt thereof and a sulfonyl group or a phosphonyl group in molecule thereof. A terminal ammonium phosphate of a polymethacrylic acid derivative is exemplified as the polymer dispersing agent. However, neither a copolymer containing a monomer represented by the General Formula (5) of the present invention, nor its effect of improving image density in the case of using the polymer dispersing agent has been described.

PTL 3 describes improvement of fixability and image density by use of a combination of printing paper containing a polyvalent water-soluble metal salt, with an ink containing a pigment and a certain phosphate group having no surface activating ability. However, an effect of improving dispersibility of the ink and image density has not been described.

CITATION LIST

Patent Literature

PTL 1 Japanese Patent Application Laid-Open (JP-A) No. 2010-189478

PTL 2 JP-A No. 2007-270089

PTL 3 JP-A No. 2011-122072

SUMMARY OF INVENTION

Technical Problem

An object of the present invention is to provide an inkjet recording ink which achieves high image density and has excellent storage stability.

Solution to Problem

A means for solving the above problems is as follows:

An inkjet recording ink, including:

water;

a water-soluble organic solvent;

a pigment; and a phosphate group-containing copolymer, wherein the phosphate group-containing copolymer contains a structural unit represented by the following General Formula (1) and a structural unit represented by the following General Formula (2):

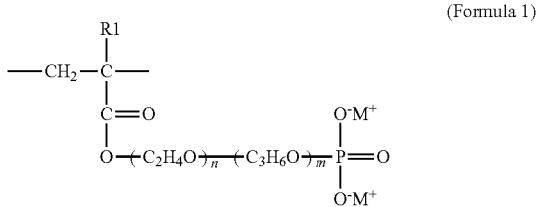

(Formula 1)

where R1 denotes a hydrogen atom or a methyl group; $M^+$ denotes an alkali metal ion, an organic amine ion, or a hydrogen ion; half or more of $M^+$ in the copolymer is the alkali metal ion or the organic amine ion, the remainder of $M^+$ is the hydrogen ion; n and m each denote an integer of 0 to 6, provided that both of n and m are not 0; and a block of $(C_2H_4O)$ and a block of $(C_3H_6O)$ may be exchanged with each other,

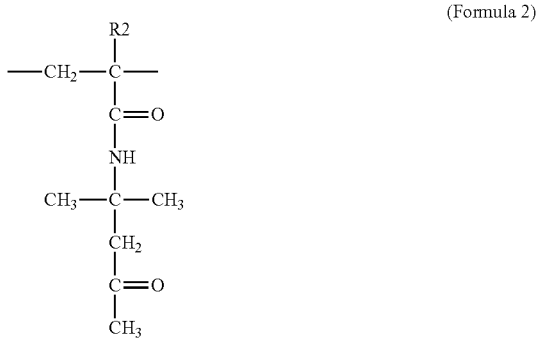

(Formula 2)

where R2 denotes a hydrogen atom or a methyl group.

Advantageous Effects of Invention

The present invention can solve the above existing problems, and achieve the above object. That is, the present invention can provide an inkjet recording ink which achieves high image density and has excellent storage stability.

Figure 1:
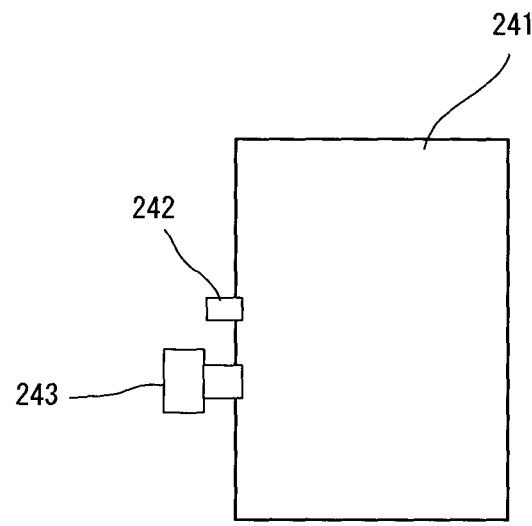
FIG. 1 is a schematic diagram illustrating one example of an ink cartridge.

DESCRIPTION OF EMBODIMENTS (Inkjet Recording Ink)
An inkjet recording ink (hereinafter may be referred to as "ink") of the present invention contains water, a water-soluble solvent, a pigment, and a phosphate group-containing copolymer; and, if necessary, other ingredients.

A mechanism of pigment aggregation in the case of using an ink of the present invention has not been known exactly, but is thought as follows:

A phosphate group or a salt of the phosphate group in a structural unit represented by the General Formula (1) has high affinity with a polyvalent metal ion, so that it is rapidly coordinated with a polyvalent metal ion eluted from a recording medium.

In the case where a copolymer containing a salt of a phosphate group used in the present invention is used as a dispersing agent, most of the copolymer is adsorbed onto a pigment in an ink. In this state, when the phosphate group or the salt of the phosphate group in a structural unit represented by the General Formula (1) is coordinated with the polyvalent metal ion eluted from the recording medium, the pigment in the ink is decreased in dispersion stability due to at least one cause of the following (1) to (3), leading to the pigment aggregation.

(1) A valence of a counter ion is increased, so that electrostatic repulsive force between pigments is decreased.
(2) The copolymer containing the salt of the phosphate group is decreased in solubility into the ink, so that a polymer adsorbing layer is decreased to thereby decrease steric repulsive force between pigments.
(3) The copolymer containing the salt of the phosphate group is decreased in solubility into the ink, so that a pigment onto which the copolymer containing the salt of the phosphate group is adsorbed is decreased in hydration stability.

In the case where the copolymer containing the salt of the phosphate group is used as an additive, the copolymer itself is coordinated with the polyvalent metal ion eluted from the recording medium to form an insoluble matter which, in turn, acts as a core of an aggregate to cause the pigment aggregation.

In an inkjet recording ink of the present invention, the phosphate group-containing copolymer contains a structural unit represented by the following General Formula (1) and a structural unit represented by the following General Formula (2); preferably further contains a structural unit represented by the following General Formula (3), a structural unit represented by the following General Formula (4), or both thereof; and, if necessary, further contains other structural units.

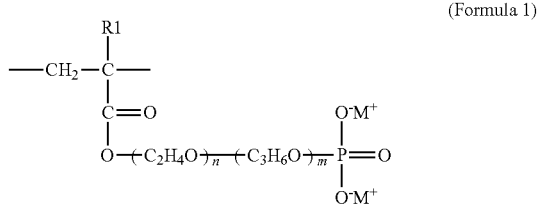

(Formula 1)

In the General Formula (1), R1 denotes a hydrogen atom or a methyl group; $M^+$ denotes an alkali metal ion, an organic amine ion, or a hydrogen ion; half or more of $M^+$ in the copolymer is the alkali metal ion or the organic amine ion, the remainder of $M^+$ is the hydrogen ion; n and m each denote an integer of 0 to 6, provided that both of n and m are not 0; and a block of $(C_2H_4O)$ and a block of $(C_3H_6O)$ may be exchanged with each other.

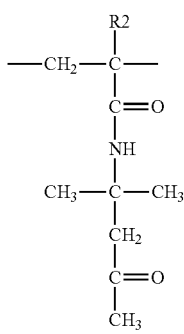

(Formula 2)

In the General Formula (2), R2 denotes a hydrogen atom or a methyl group.

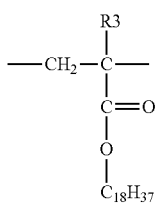

(Formula 3)

In the General Formula (3), R3 denotes a hydrogen atom or a methyl group.

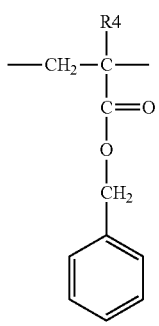

(Formula 4)

In the General Formula (4), R4 denotes a hydrogen atom or a methyl group.

The structural unit represented by the General Formula (1) is characterized by exhibiting hydrophilicity, but exhibiting hydrophobicity in a state of being bound to a polyvalent metal ion (in particular, a calcium ion). Accordingly, in the case where an ink which contains a copolymer having a structural unit represented by the General Formula (1) is used to form an image on printing paper containing a water-soluble polyvalent metal salt, the structural unit represented by the General Formula (1) is hydrophobized by the action of a polyvalent metal ion eluted from the paper to the ink to thereby form an aggregate with a pigment. As a result, the pigment remains on a surface of the paper, leading to an improved image density.

However, in the case of plain paper, a polyvalent metal salt contained in the paper is generally a water-insoluble calcium carbonate, so that only a small amount of calcium ion is eluted into an ink. Therefore, the structural unit represented by the General Formula (1) is not enough to achieve satisfactory image density.

As a means for solving the problem, there has been proposed that a percentage of the structural unit represented by the General Formula (1) is increased in the phosphate group-containing copolymer. However, when the percentage of the structural unit represented by the General Formula (1) is increased, the copolymer is formed into a gel, leading to a deteriorated storage stability of the ink. This is probably because an interaction between phosphate groups is enhanced. Therefore, conventionally, in the case where a phosphate group-containing copolymer is used, a percentage of a phosphate group-containing structural unit had to be less than 20% by mass.

In contrast, in the present invention, the structural unit represented by the General Formula (1) is used in combination with the structural unit represented by the General Formula (2), and preferably with the structural unit represented by the General Formula (3), the structural unit represented by the General Formula (4), or both thereof. Therefore, the affinity with the pigment and an effect of forming the aggregation with the pigment are improved. Storage stability is also improved even in an ink containing a large amount of a water-soluble organic solvent. Additionally, a copolymer is less likely to be formed into a gel. As a result, a percentage of the structural unit represented by the General Formula (1) can be increased, and reactivity with the polyvalent metal ion (in particular, calcium ion) can be improved.

The structural unit represented by the General Formula (3), the structural unit represented by the General Formula (4), or both thereof has particularly high affinity with the pigment. Combined use of the structural unit represented by the General Formula (2) therewith improves the affinity with the pigment, and prevents the copolymer from being formed into a gel.

Thus, an inkjet recording ink of the present invention can achieve high image density even in common plain paper which contains a small amount of a polyvalent water-soluble metal salt and be improved in storage stability and ejection stability by using the phosphate group-containing copolymer which contains the structural unit represented by the General Formula (1), the structural unit represented by the General Formula (2), and, preferably, the structural unit represented by the General Formula (3), the structural unit represented by the General Formula (4), or both thereof.

An ink of the present invention contains water, a water-soluble organic solvent, a pigment, and a phosphate group-containing copolymer; and, if necessary, other ingredients. Each of these ingredients will be described hereinafter.

<Phosphate Group-Containing Copolymer>

The phosphate group-containing copolymer at least the structural unit represented by the General Formula (1) and the structural unit represented by the General Formula (2); preferably further contains the structural unit represented by the General Formula (3), the structural unit represented by the General Formula (4), or both thereof; and, if necessary, further contains other structural units.

The phosphate group-containing copolymer can be obtained by allowing a monomer represented by the following General Formula (5) to polymerize with a monomer represented by the following General Formula (6). The copolymer is preferably allowed to further polymerize with a monomer represented by the following General Formula (7), a monomer represented by the following General Formula (8), or both thereof, and, if necessary, with other monomers.

Then, the resultant copolymer is neutralized with an alkali metal base or an organic amine base.

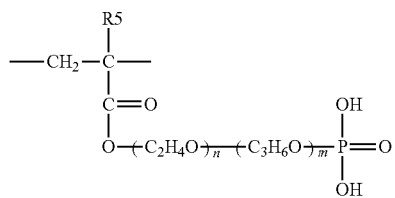
(Formula 5)

In the General Formula (5), R5 denotes a hydrogen atom or a methyl group, and n and m each denote an integer of 0 to 6, provided that both of n and m are not 0.

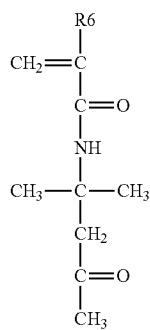
(Formula 6)

In the General Formula (6), R6 denotes a hydrogen atom or a methyl group.

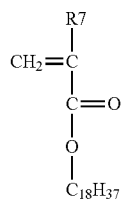
(Formula 7)

In the General Formula (7), R7 denotes a hydrogen atom or a methyl group.

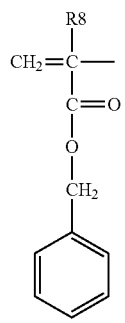
(Formula 8)

In the General Formula (8), R8 denotes a hydrogen atom or a methyl group.

Conventional general copolymerization methods may be used. For example, the following method can be used. To a solvent contained in a flask equipped with a stirrer, a thermometer, and a nitrogen-inducing pipe, are added the monomer represented by the General Formula (5) and the monomer represented by the General Formula (6), and preferably further the monomer represented by the General Formula (7), the monomer represented by the General Formula (8), or both thereof, followed by allowing to react together in the presence of a polymerization initiator, under reflux in a nitrogen gas, at a temperature of about 60° C. to about 150° C.

A molecular weight of the copolymer can be controlled by adjusting a concentration of the monomer upon polymerization and/or an amount of the polymerization initiator. Copolymerization aspect of the copolymer is not particularly limited. For example, the copolymer may be a block copolymer or a random copolymer.

Examples of monomers represented by the General Formulae (5) to (8) include monomers represented by the General Formulae (5-1) to (5-5), (6-1), (6-2), (7-1), (7-2), (8-1), and (8-2).

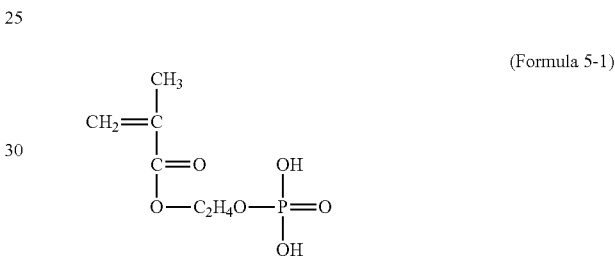
(Formula 5-1)

(Formula 5-2)

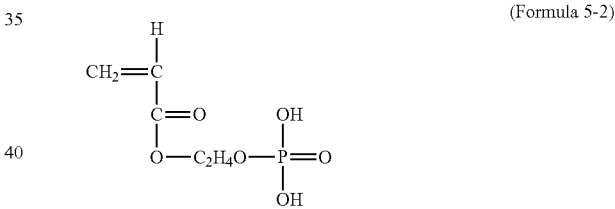
(Formula 5-3)

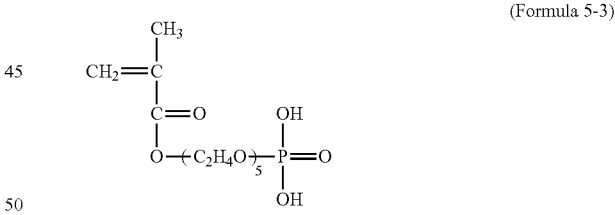
(Formula 5-4)

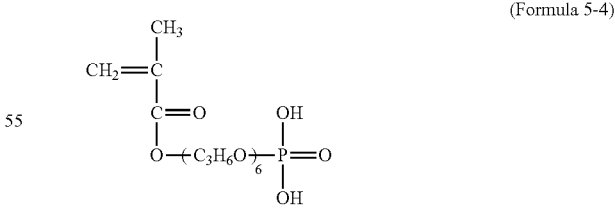
(Formula 5-5)

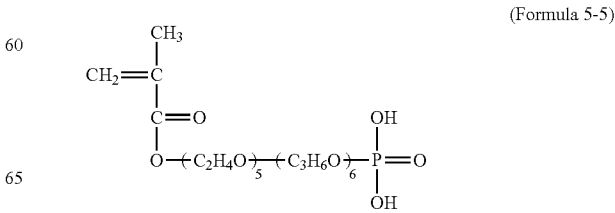

(Formula 6-1)
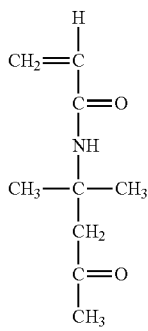

(Formula 6-2)
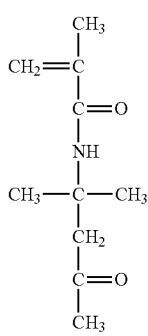

(Formula 7-1)
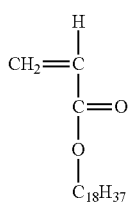

(Formula 7-2)
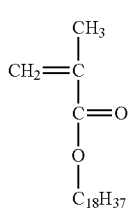

(Formula 8-1)
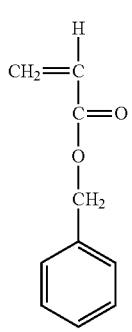

(Formula 8-2)
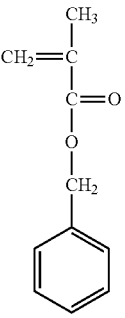

A percentage of the structural unit represented by the General Formula (1) in the phosphate group-containing copolymer is preferably 10% by mass to 80% by mass, more preferably 10% by mass to 60% by mass, further preferably 20% by mass to 40% by mass, relative to a mass of the copolymer. When the structural unit is contained in a percentage falling within the above range, the most excellent image density, dispersibility, and storage stability can be achieved.

A mass average molecular weight of the phosphate group-containing copolymer is preferably 3,000 to 60,000, more preferably 5,000 to 50,000, further preferably 6,000 to 30,000.

An amount of the phosphate group-containing copolymer is preferably 0.05% by mass to 10.0% by mass, more preferably 0.5% by mass to 5% by mass, further preferably 1% by mass to 3% by mass, on a solid basis, relative to a total mass of an ink.

An effect of improving image density begins to be developed over 0.5% by mass. Meanwhile, use of 10.0% by mass or less of the phosphate group-containing copolymer enables a viscosity of an ink to fall within a range suitable for being ejected from an ink head.

Use of the phosphate group-containing copolymer as a pigment-dispersing agent is preferable because image density in plain paper and storage stability of an ink containing 10% by mass to 60% by mass of a water-soluble organic solvent are further improved. An amount of the water-soluble organic solvent is more preferably 20% by mass to 50% by mass.

In the case where the phosphate group-containing copolymer is used as the pigment-dispersing agent, an amount of the phosphate group-containing copolymer is 1% by mass to 100% by mass, preferably 5% by mass to 80% by mass, further preferably 10% by mass to 50% by mass, relative to 100% by mass of a pigment. When the amount of phosphate group-containing copolymer falls within the above range, a particle diameter of the pigment is the most suitable, leading to excellent image density, dispersibility, and storage stability.

Phosphate groups in the phosphate group-containing copolymer are preferably partially or wholly neutralized with bases to thereby be ionized. Examples of the bases to be used for neutralization include alkali metals such as lithium hydroxide, sodium hydroxide, and potassium hydroxide; ammonium; mono-, di-, or trimethylamine; mono-, di-, or tri-ethylamine; monoethanolamine, diethanolamine, triethanolamine, methylethanolamine, methyldiethanolamine, dimethylethanolamine, choline, aminoethane propanediol, monopropanolamine, dipropanolamine, tripropanolamine, isopropanolamine, trishydroxymethylaminomethane, aminoethylpropanediol; organic ammoniums such as tetramethylammonium, tetraethylammonium, and tetrabutylammonium; cyclic amines such as morpholine, N-methyl morpholine, N-methyl-2 pyrrolidone, and 2-pyrrolidone.

The M in the General Formula (1) constituting the phosphate group-containing copolymer is preferably a hydrogen atom, a potassium atom, or a sodium atom. When the M is any of these atoms, image density is improved. This is probably because a pigment is more likely to aggregate when a counter ion of a phosphate group is any of the above-described atoms upon moisture evaporation from an ink.

As for the M in the General Formula (1) constituting the phosphate group-containing copolymer, a percentage of the number of a hydrogen atom is preferably 40% or less relative to the total number of the M in the copolymer. When the percentage is 40% or less, a pigment dispersion and an ink are improved in storage stability. A pigment is kept in a dispersion state in a dispersion and in an ink due to repulsion between negative charges of the phosphate group. Accordingly, in the case where the M is a metal atom or an organic amine, repulsive force between pigments is enhanced, leading to stable dispersion.

Note that, the percentage of the number of a hydrogen atom relative to the total number of the M in the copolymer can be determined according to the following expression: 100%−neutralization rate (%) where the neutralization rate (%) is defined below.

In the present invention, the neutralization rate of a phosphate group in the copolymer obtained through neutralization is defined as a value determined according to the below-described method. Actually, the neutralization rate herein is different from a percentage of a proton substituted with a metal ion or an organic ammonium ion in the copolymer.

When the compound represented by the General Formula (5) is assumed to be Monomer 1, the following equation is satisfied:

Neutralization rate $X$ (%)=(Number of moles of Base to be added×Valence of positive ion of Base)/(Number of moles of Monomer 1 contained in copolymer×2)×100 where Number of moles of Base to be added=Amount of Base to be added Yg/Molecular weight of Base, and Number of moles of Monomer 1 contained in copolymer=Amount of Monomer 1 to be charged Zg/Molecular weight of Monomer 1.

Accordingly, an amount of a base which is required to achieve the neutralization rate $X$ (%) is expressed as the following equation:

Amount of Base to be added Yg=Neutralization rate $X$ (%)×(Amount of Monomer 1 to be charged×2)×Molecular weight of Base/(Valence of positive ion of Base×100×Molecular weight of Monomer 1).

<Water>

An ink of the present invention uses water as a liquid medium. Examples of the water include pure water such as ion-exchanged water, ultrafiltrated water, Milli-Q water, and distilled water.

<Water-Soluble Organic Solvent>

An ink of the present invention contains a water-soluble organic solvent for the purpose of preventing the ink from drying as a wetting agent, improving dispersing stability, and preventing curling in plain paper. The water-soluble organic solvent may be used in combination.

Specific examples of the water-soluble organic solvent include:

polyhydric alcohols, such as ethylene glycol, diethylene glycol, triethylene glycol, tetraethylene glycol, polyethylene glycol, polypropylene glycol, dipropylene glycol, tripropylene glycol, poly polypropylene glycol, 1,3-butanediol, 3-methyl-1,3-butanediol, 1,5-pentanediol, 1,6-hexane diol, glycerin, isopropylidene glycerol, trimethylolethane, trimethylolpropane, 1,2,3-butanetriol, 1,2,4-butanetriol, 1,2,6-hexanetriol, and petriol;

polyhydric alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether;

polyhydric alcohol aryl ethers, such as ethylene glycol monophenyl ether, and ethylene glycol monobenzyl ether;

nitrogen-containing heterocyclic compounds, such as 2-pyrrolidone, N-methyl-2-pyrrolidone, N-hydroxyethyl-2-pyrrolidone, 1,3-dimethylimidazolidinone, ε-caprolactam, and γ-butyrolactone; amides, such as formamide, N-methylformamide, N,N-dimethylformamide, N,N-dimethyl-β-methoxypropionamide, and N,N-dimethyl-β-butoxy propionamide;

amines, such as monoethanolamine, diethanolamine, triethanolamine, monoethylamine, diethylamine, and triethylamine; sulfur-containing compounds, such as dimethyl sulfoxide, sulfolane, and thiodiethanol; and 3-ethyl-3-hydroxymethyloxetane, propylene carbonate and ethylene carbonate.

Among these water-soluble organic solvents, particularly preferable are 3-ethyl-3-hydroxymethyloxetane, isopropylidene glycerol, N,N-dimethyl-β-methoxypropionamide, and N,N-dimethyl-β-butoxy propionamide, which are excellent in preventing curling in plain paper.

In addition, 1,3-butanediol, diethyleneglycol, 2,2,4-trimethyl-1,3-pentanediol, triethylene glycol, and/or glycerol are excellent in preventing ejection failure due to moisture evaporation.

Additionally, saccharides may be contained as a wetting agent. Examples of the saccharides include monosaccharides, disaccharides, oligosaccharides (including trisaccharides, and tetrasaccharides), and polysaccharides. Preferable examples thereof include glucose, mannose, fructose, ribose, xylose, arabinose, galactose, maltose, cellobiose, lactose, sucrose, trehalose, and maltotriose. As used herein, the polysaccharides mean saccharides in a broad sense, which may include materials existing widely in nature, such as α-cyclodextrin and cellulose.

Moreover, examples of derivatives of the saccharides include reducing sugars, oxidized sugars, amino acids, and thio acids of the saccharides. Sugar alcohol is particularly preferable. Specific examples of the sugar alcohol include maltitol and sorbitol.

A ratio of the pigment to the water-soluble organic solvent greatly affects ejection stability of the ink from an ink head. When a solid content of the pigment is large, but an amount of the water-soluble organic solvent is small, moisture evaporation proceeds in proximity to an ink meniscus of a nozzle, leading to ejection failure.

An amount of the water-soluble organic solvent is preferably 10% by mass to 60% by mass, more preferably 20% by mass to 50% by mass, relative to a total amount of an ink. An ink containing the water-soluble organic solvent in an amount falling within the above range has highly excellent drying property and ejection reliability.

<Pigment>

An amount of a pigment to be used in the present invention contained in an ink is preferably 0.1% by mass to 20.0% by mass.

When the amount is 0.1% by mass or more, low image density and unclear printing can be prevented. When the amount is 20.0% by mass or less, excessively high viscosity of the ink and a clogged nozzle can be prevented.

A 50% volume average particle diameter of the pigment is preferably 150 nm or less. The 50% volume average particle diameter of the pigment is a value of D50 measured by means of MICROTRAC UPA (manufactured by Nikkiso Co., Ltd.) through a dynamic light scattering method in an environment of 23° C. and 55% RH.

A type of the pigment is not particularly limited and may be appropriately selected depending on the intended purpose. For example, the pigment may be an inorganic pigment or an organic pigment. The pigment may be used alone or in combination.

Examples of the inorganic pigment include titanium oxide, iron oxide, calcium carbonate, barium sulfate, aluminum hydroxide, barium yellow, navy blue, cadmium red, chrome yellow, metal powder, and carbon black. Among them, carbon black is preferable.

Examples of the organic pigment include an azo pigment, an azomethine pigment, a polycyclic pigment, a dye chelate, a nitro pigment, a nitroso pigment, and aniline black. Among them, the azo pigment and the polycyclic pigment are preferable.

Examples of the azo pigment include azo lake, an insoluble azo pigment, a condensed azo pigment, and a chelate azo pigment.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, and a rhodamine B lake pigment.

Examples of the dye chelate include a basic dye-type chelate and an acidic dye-type chelate.

Examples of a pigment for a black ink include carbon blacks (C.I. Pigment Black 7) such as furnace black, lampblack, acetylene black, and channel black; metals such as copper and iron (C.I. Pigment Black 11); metal compound such as titanium oxide; organic pigments such as aniline black (C.I. Pigment Black 1).

Preferable example of the carbon black include carbon blacks produced by a furnace method or a channel method, with a primary particle diameter of 15 nm to 40 nm, a specific surface area as measured by a BET method of 50 $m^2/g$ to 300 $m^2/g$, a DBP oil absorption amount of 40 mL/100 g to 150 mL/100 g, a volatile matter content of 0.5% to 10%, and a pH of 2 to 9.

Commercially available products of the carbon black include No. 2300, No. 900, MCF-88, No. 33, No. 40, No. 45, No. 52, MA7, MA8, MA100, and No. 2200B (all manufactured by Mitsubishi Chemical Corporation); RAVEN 700, RAVEN 5750, RAVEN 5250, RAVEN 5000, RAVEN 3500, and RAVEN 1255 (all manufactured by Columbia Corp); REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, and MONARCH 1400 (all manufactured by Cabot Corporation); and COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK 5170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (all manufactured by Degussa AG).

A pigment for a yellow ink is not particularly limited and may be appropriately selected depending on the intended purpose. Examples thereof include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

A pigment for a magenta ink is not particularly limited and may be appropriately selected depending on the intended purpose. Examples thereof include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

A pigment for a cyan ink is not particularly limited and may be appropriately selected depending on the intended purpose. Examples thereof include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, and C.I. Pigment Blue 66; and C.I. Bat Blue 4 and C.I. Bat Blue 60.

Novel pigments produced for the present invention may be used in an ink of the present invention.

Note that, use of Pigment Yellow 74 as a yellow pigment, Pigment Red 122 and Pigment Violet 19 as a magenta pigment, and Pigment Blue 15:3 as a cyan pigment makes it possible to obtain a balanced ink which is excellent in color tone and light resistance.

<Other Ingredients>

The other ingredients are not particularly limited and may be appropriately selected depending on the intended purpose. Examples thereof include a dispersing agent, a penetrating agent, a pH adjusters, a water-dispersible resin, a antiseptic and antifungal agent, a chelating reagent, a rust preventive agent, an antioxidant, a ultraviolet absorber, an oxygen absorber, and a light stabilizer.

—Dispersing Agent—

The dispersing agent is preferably the phosphate group-containing copolymer. However, various surfactants such as an anionic surfactant, a cationic surfactant, an amphoteric surfactant, and a nonionic surfactant; and polymer dispersing agents may also be used. These may be used alone or in combination.

Examples of the anionic surfactant include alkyl sulfocarboxylate, α-olefin sulfonate, polyoxyethylene alkyl ether acetate, N-acylamino acid and salts thereof, N-acyl methyl taurine salt, polyoxyalkyl ether sulfate, polyoxyethylene alkyl ether phosphate, rosin acid soap, castor-oil sulfate ester salt, lauryl alcohol sulfate ester salt, alkylphenol type phosphate ester, naphthalenesulfonate formalin condensate, alkyl-type phosphate ester, alkyl aryl sulfonate, diethyl sulfosuccinate, diethyl hexyl sulfosuccinate, and dioctyl sulfosuccinate.

Examples of the cationic surfactant include 2-vinylpyridine derivative and poly-4-vinylpyridine derivative.

Examples of the amphoteric surfactant include lauryl dimethylamino acetic acid betaine, 2-alkyl-N-carboxymethyl-N-hydroxyethylimidazolinium betaine, coconut oil fatty acid amide propyl dimethylamino acetic acid betaine, polyoctyl polyaminoethyl glycine, and imidazoline derivative.

Examples of the nonionic surfactant include:

ether-based surfactants, such as polyoxyethylene nonylphenyl ether, polyoxyethylene octylphenyl ether, polyoxyethylene dodecyl phenyl ether, polyoxyethylene lauryl ether, polyoxyethylene oleyl ether, polyoxyethylene alkyl ether, and polyoxyaralkyl alkyl ether;

ester-based surfactants, such as polyoxyethylene oleate, polyoxyethylene oleate ester, polyoxyethylene distearate ester, sorbitan laurate, sorbitan monostearate, sorbitan monooleate, sorbitan sesquioleate, polyoxyethylene monooleate, and polyoxyethylene stearate; and acetylene glycol-based surfactants, such as 2,4,7,9-tetramethyl-5-decyne-4,7-diol, 3,6-dimethyl-4-octyne-3,6-diol, and 3,5-dimethyl-1-hexyne-3-ol.

—Penetrating Agent—

Unlike the water-soluble organic agent used as the wetting agent, the penetrating agent to be used is those having relatively low wettability, i.e., non-wetting penetrating agent. That is, preferable are those having a solubility of 0.2% by mass to 5.0% by mass in water at 25° C.

Specifically, a polyol compound having 8 to 11 carbon atoms or a glycol ether compound having 8 to 11 carbon atoms is preferably contained. Among them, particularly preferable are 2-ethyl-1,3-hexane diol [solubility: 4.2% by mass (25° C.)], and 2,2,4-trimethyl-1,3-pentanediol [solubility: 2.0% by mass (25° C.)].

Examples of other aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexane diol, and 5-hexene-1,2-diol.

Other penetrating agents capable of being used in combination therewith are not particularly limited and may be appropriately selected depending on the intended purpose, so long as they can be dissolved in an ink and adjusted to desired physical properties. Examples thereof include alkyl and aryl ethers of polyhydric alcohols, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol.

An amount of the penetrating agent contained in an ink is preferably 0.1% by mass to 4.0% by mass. When the amount is less than 0.1% by mass, satisfactory quick-drying property can not achieved, potentially leading to a blurred image. When the amount is greater than 4.0% by mass, the pigment is deteriorated in dispersion stability, making it likely to cause a clogged nozzle. Alternatively, the resultant ink excessively penetrates into a recording medium, potentially leading to a deterioration in the image density or occurrence of set-off.

—pH Adjuster—

The pH adjuster is not particularly limited and may be appropriately selected depending on the intended purpose, so long as it can adjust the pH to 8.5 to 11, preferably 9 to 11, without adversely affecting the resultant ink. When the pH is less than 8.5 or greater than 11, a large amount of an inkjet head or an ink supply unit is dissolved out, potentially leading to a defect such as deterioration, leakage, or ejection failure of the resultant ink. When the pH is less than 8.5, the resultant ink is decreased in the pH during storage, so that polymer particles may be increased in particle diameter to aggregate together. For example, the pH can be measured by a pH meter HM-30R (manufactured by DKK-TOA Corporation).

Examples of the pH adjuster include alcohol amines, hydroxides of alkali metal elements, hydroxides of ammonium, hydroxides of phosphonium and carbonates of alkali metals.

Examples of the alcohol amines include diethanolamine, triethanolamine, and 2-amino-2-ethyl-1,3 propanediol.

Examples of the hydroxides of alkali metal elements include lithium hydroxide, sodium hydroxide, and potassium hydroxide.

Examples of the hydroxides of ammonium include ammonium hydroxide, and quaternary ammonium hydroxide.

Examples of the hydroxides of phosphonium include quaternary phosphonium hydroxide.

Examples of the carbonates of alkali metals include lithium carbonate, sodium carbonate, and potassium carbonate.

—Water-Dispersible Resin—

The water-dispersible resin is excellent in film formation performance (image formation performance), and has high water repellency, water resistance, and weather resistance. Accordingly, it is useful for recording an image which is water resistant and has high image density (high color-developability). Examples thereof include condensation-type synthetic resins, addition-type synthetic resins, and natural polymer compounds.

Examples of the condensation-type synthetic resin include a polyester resin, a polyurethane resin, a polyepoxy resin, a polyamide resin, a polyether resin, a poly(meth) acrylic resin, an acryl-silicone resin, and a fluorine-based resin.

Examples of the addition-type synthetic resin include a polyolefin resin, a polystyrene-based resin, a polyvinyl alcohol-based resin, a polyvinyl ester-based resin, a polyacrylic acid-based resin, and an unsaturated carboxylic acid-based resin.

Examples of the natural polymer compounds include celluloses, rosins, and natural rubber.

Among them, preferable are polyurethane resin particles, acryl-silicone resin particles, and fluorine-based resin particles.

An average particle diameter of the water-dispersible resin correlates with the viscosity of a dispersion. In the case of water-dispersible resins which are the same in composition as each other, but different in the average particle diameter from each other, as the particle diameter becomes smaller, the viscosity increases with the same solid contents. In order to prevent the ink from having excessively high viscosity, the water-dispersible resin preferably has the volume average particle diameter of 50 nm or more. When the volume average particle diameter is several ten micrometers, the resultant ink cannot be used because the particle diameter is larger than a nozzle opening of an inkjet head. Even when the particle diameter is smaller than the nozzle opening, the presence of large particles in the ink deteriorates ejection stability. In order to prevent the ejection stability from being impaired, the volume average particle diameter is preferably 200 nm or less.

The water-dispersible resin preferably has a function to fix a water-dispersible pigment onto a paper surface, and forms a film at a normal temperature to improve fixability of the pigment. Therefore, the minimum film forming temperature (MFT) of the water-dispersible resin is preferably 30° C. or less.

When the glass transition temperature of the water-dispersible resin is −40° C. or lower, a resin coating is increased in consistency, leading to tack in printed matter. Therefore, the glass transition temperature of the water-dispersible resin is preferably −30° C. or higher.

An amount of the water-dispersible resin contained in the ink is preferably 1% by mass to 15% by mass, more preferably 2% by mass to 7% by mass on a solid basis.

—Antiseptic and Antifungal Agent—

Examples of the antiseptic and antifungal agent include sodium dehydroacetate, sodium sorbate, 2-pyridinethiol-1-oxide sodium, sodium benzoate, and pentachlorophenol sodium.

—Chelating Reagent—

Examples of the chelating reagent include sodium ethylenediamine tetraacetate, sodium nitrilotriacetate, sodium hydroxyethyl ethylenediamine triacetate, sodium diethylenetriamine pentaacetate, and sodium uramil diacetate.

—Rust Preventive Agent—

Examples of the rust preventive agent include acidic sulfite, sodium thiosulfate, ammonium thiodiglycolate, diisopropyl ammonium nitrite, pentaerythritol tetranitrate, and dicyclohexyl ammonium nitrite.

—Antioxidant—

Examples of the antioxidant include phenolic antioxidants (including hindered phenolic antioxidants), amine-based antioxidants, sulfur-based antioxidants, and phosphorus-based antioxidants.

—Ultraviolet Absorber—

Examples of the ultraviolet absorber include benzophenone-based ultraviolet absorbers, benzotriazole-based ultraviolet absorbers, salicylate-based ultraviolet absorbers, cyanoacrylate-based ultraviolet absorber, and nickel complex salt-based ultraviolet absorbers.

<Production Method of Inkjet Recording Ink>

An inkjet recording ink of the present invention is produced by dispersing or dissolving water, a water-soluble organic solvent, a pigment, a phosphate group-containing copolymer, and, if necessary, other ingredients into an aqueous medium, followed by appropriately stirring and mixing.

The pigment is contained in an ink as a pigment dispersion prepared by mixing water, a pigment, and, if necessary, a dispersing agent and other materials, followed by dispersing with known dispersers to adjust its particle diameter.

For example, the dispersing can be performed with a sand mill, a homogenizer, a ball mill, a paint shaker, or an ultrasonic disperser. The stirring and mixing can be performed with a stirrer with a typical stirring blade, a magnetic stirrer, or a high speed disperser.

A concentration of the pigment to be used for producing the pigment dispersion is preferably 0.1% by mass to 50% by mass, particularly preferably 0.1% by mass to 30% by mass.

If necessary, the pigment dispersion and the resultant ink are preferably filtered through a filter or subjected to centrifugation to thereby remove coarse particles, followed by degassing.

Physical properties of an ink of the present invention are not particularly limited and may be appropriately selected depending on the intended purpose.

For example, the viscosity of the ink is preferably 3 mPa·s to 20 mPa·s at 25° C. When the viscosity is 3 mPa—s or more, an effect of improving printing density and character quality can be attained. When the viscosity is 20 mPa·s or less, ejection property can be ensured.

For example, the viscosity can be measured at 25° C. by means of a viscometer (RL-550, manufactured by Toki Sangyo Co., Ltd.).

A surface tension of the ink is preferably 40 mN/m or less at 25° C. When the surface tension is 40 mN/m or less, leveling of the ink is prevented on a recording medium, and the ink does not take a long time to be dried.

(Ink Cartridge)

An ink cartridge of the present invention includes a container and an ink of the present invention stored in the container. The ink cartridge may further include other members, which are appropriately selected as needed.

The shape, structure, size, and material of the container are not particularly limited and may be appropriately selected depending on the intended purpose. For example, those having an ink bag made of aluminum laminated film or resin film may be used.

One example of the ink cartridge of the present invention will be described with reference to FIGS. 1 and 2.

Figure 2:
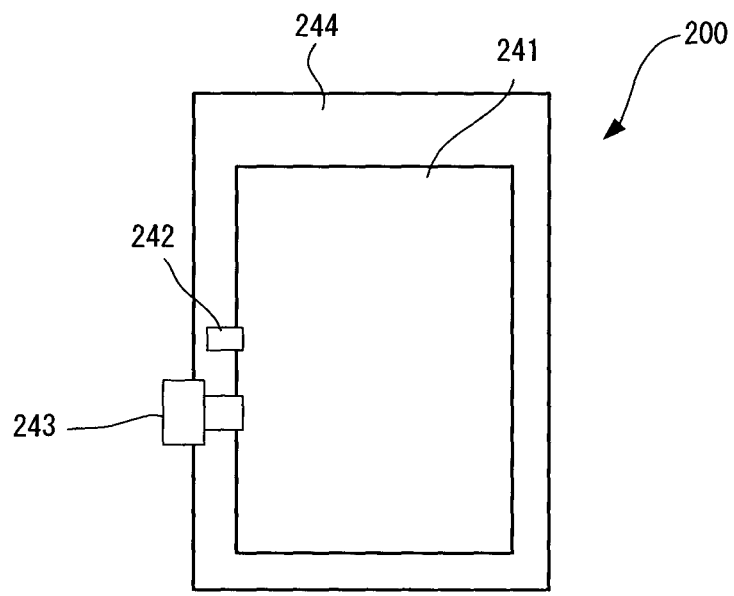
FIG. 2 is a schematic diagram illustrating the ink cartridge illustrated in FIG. 1 and a case thereof.

FIG. 1 is a diagram illustrating one example of an ink cartridge of the present invention. FIG. 2 is a diagram illustrating the ink cartridge 200 illustrated in FIG. 1 and a case (exterior) thereof. As shown in FIG. 1, in an ink cartridge 200, an ink bag 241 is filled with ink via an ink inlet 242. After the air is discharged therefrom, the ink inlet 242 is sealed by welding. When using, a needle provided in a device body is stuck into an ink outlet 243, which is made of a rubber member, to thereby supply the ink to the device.

The ink bag 241 is made from a packaging material such as an aluminum laminated film with no air permeability. As shown in FIG. 2, the ink bag 241 is usually stored in a cartridge case 244 which is made of plastics, and is configured to be detachably mounted on various inkjet recording devices.

(Inkjet Recording Device and Inkjet Recording Method)

An inkjet recording device of the present invention includes at least an ink jetting unit; and, if necessary, further includes appropriately selected other units such as a stimulus generating unit and a controlling unit.

An inkjet recording method of the present invention includes at least an ink jetting step; and, if necessary, further includes appropriately selected other steps such as a stimulus generating step and a controlling step.

The inkjet recording method of the present invention can be suitably performed by means of the inkjet recording device of the present invention, and the ink jetting step can be suitably performed by means of the ink jetting unit. Moreover, the other steps can be suitably performed by means of the other units.

The ink jetting step is a step of applying a stimulus to an ink to allow the ink to jet, to thereby form an image.

The ink jetting unit is a unit configured to apply a stimulus to an ink to allow the ink to jet, to thereby form an image. The ink jetting unit is not particularly limited. Examples thereof include various nozzles used for ejecting inks.

The stimulus can be generated, for example, by a stimulus generating unit. The stimulus is not particularly limited and may be appropriately selected depending on the intended purpose. Examples thereof include heat (temperature), pressure, vibration, and light. These may be used alone or in combination. Among them, heat and pressure are suitable.

The stimulus generating unit may be a heating device, a pressurizing device, a piezoelectric element, a vibration generator, an ultrasonic wave oscillator, and a light. Specific examples of the stimulus generating unit include a piezoelectric actuator such as a piezoelectric element; a thermal actuator utilizing a phase change due to film boiling of liquid caused by using an electric-heat transducer such as a heat element; a shape memory alloy actuator utilizing a metal phase change due to a temperature change; and an electrostatic actuator utilizing electrostatic force.

An embodiment of the jetting of the ink is not particularly limited, and varies depending on the stimulus. In the case where the stimulus is "heat", for example, there is a method in which a thermal energy corresponding to a recording signal is applied to the ink in a recording head, for example, by a thermal head, to thereby generate bubbles in the ink by the action of the thermal energy, and then, by the action of pressure of the bubbles, droplets of the ink are allowed to be ejected from a nozzle hole of the recording head.

Meanwhile, in the case where the stimulus is "pressure", there is a method in which voltage is applied to a piezoelectric element adhered to a pressure chamber in an ink flow channel within a recording head, to thereby bend the piezoelectric element, and reduce a volume of the pressure chamber, so that droplets of the ink are allowed to be ejected from a nozzle hole of the recording head.

The controlling unit is not particularly limited and may be appropriately selected depending on the intended purpose, as long as it can control operation of each of the units. Examples thereof include a device such as a sequencer and a computer.

One embodiment for performing an inkjet recording method of the present invention by an inkjet recording device of the present invention will be described hereinafter with reference to figures.

Figure 3:
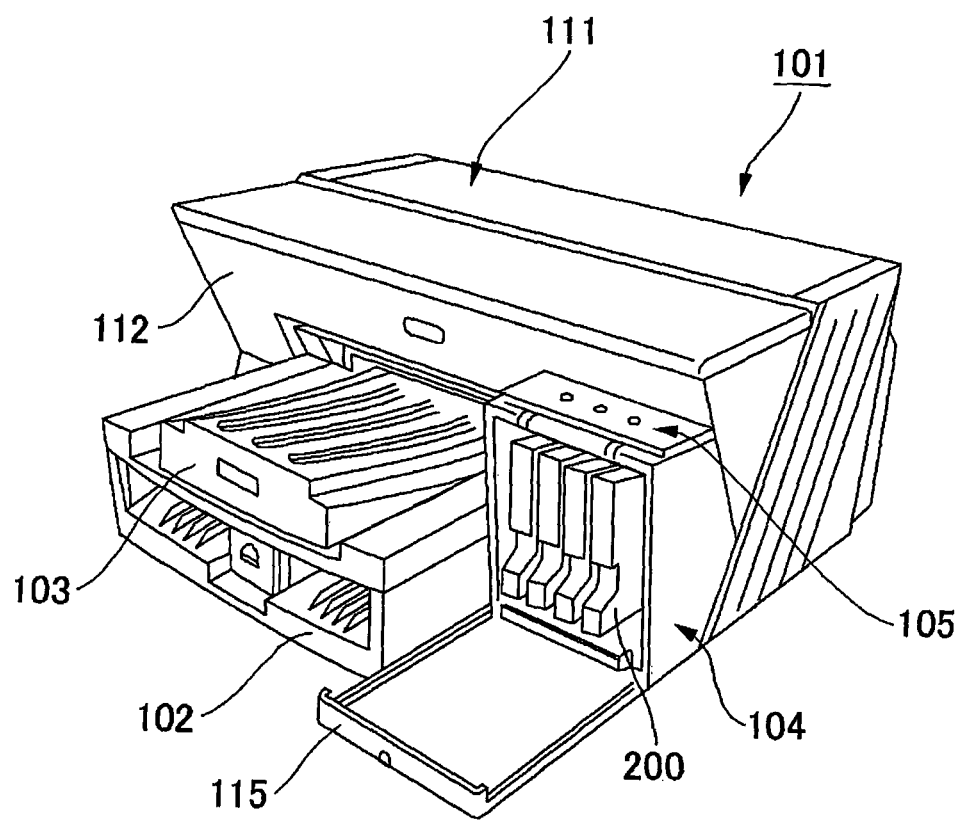
FIG. 3 is a perspective diagram illustrating one example of an inkjet recording device.

FIG. 3 is a schematic diagram illustrating one example of a serial type inkjet recording device of the present invention. This inkjet recording device contains a device main body 101, a paper feeding tray 102 provided in the device main body 101 and configured to feed a sheet of paper, a paper discharging tray 103 provided in the device main body 101 and configured to store a sheet of paper on which an image has been recorded (formed), and an ink cartridge loading section 104.

On an upper surface of the ink cartridge loading section 104, a control section 105 such as operation keys and a display is provided. The ink cartridge loading section 104 has a front cover 115 that can be opened and closed for attaching or detaching the ink cartridge 200.

Figure 4:
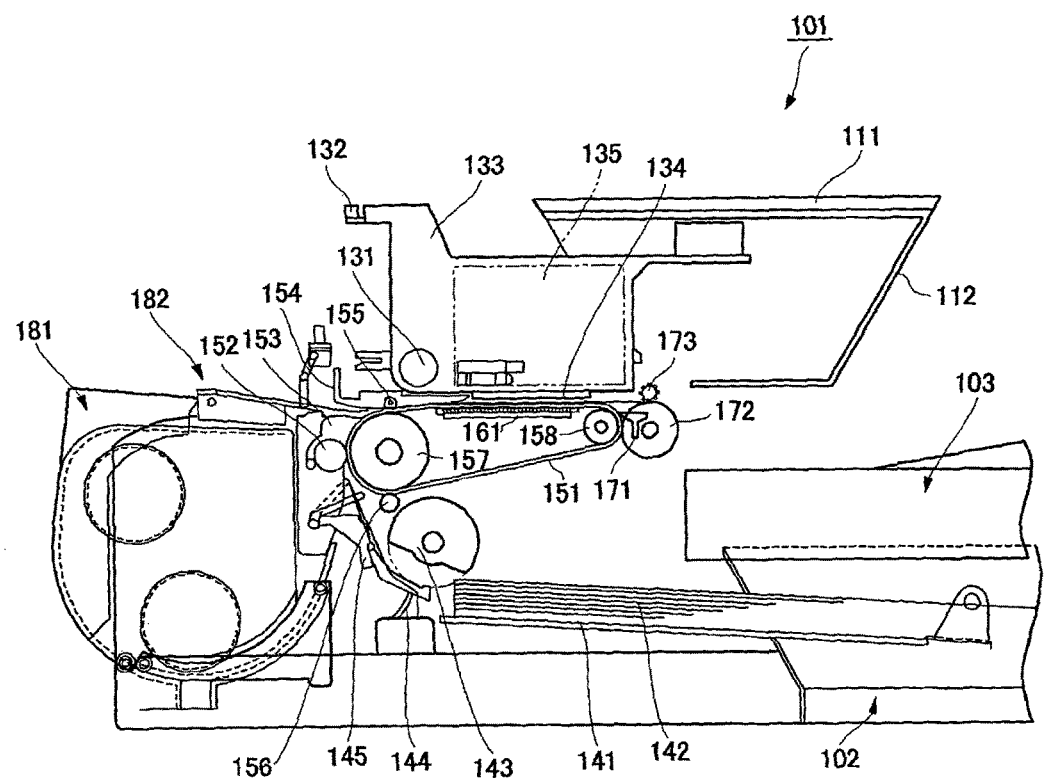
FIG. 4 is a diagram illustrating one example of the inkjet recording device illustrated in FIG. 3.
Figure 5:
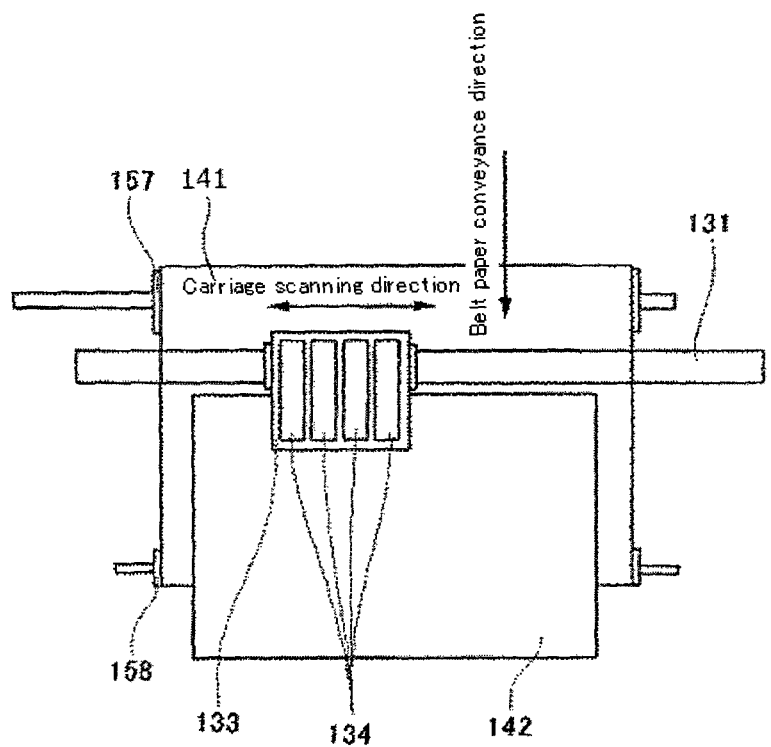
FIG. 5 is a schematic enlarged diagram illustrating one example of an inkjet head of the inkjet recording device illustrated in FIG. 3.

In the device main body 101, as illustrated in FIGS. 4 and 5, a carriage 133 is slidably held in a main-scanning direction by a guide rod 131, which is a guide member horizontally bridged between left and right side plates, and a stay 132; and is moved for scanning in an arrow direction in FIG. 5 by a main scanning motor.

A recording head 134 composed of four inkjet recording heads configured to eject ink droplets of yellow (Y), cyan (C), magenta (M) and black (Bk) is installed in the carriage 133 such that a plurality of ink ejection outlets are aligned in the direction intersecting the main-scanning direction and that the ink droplet ejection direction faces downward.

For each of the inkjet recording heads constituting the recording head 134, it is possible to use, for example, a head provided with any of the following energy-generating units for ejecting ink: a piezoelectric actuator such as a piezoelectric element; a thermal actuator utilizing a phase change due to film boiling of liquid caused by using an electric-heat transducer such as a heat element; a shape memory alloy actuator utilizing a metal phase change due to a temperature change; and an electrostatic actuator utilizing electrostatic force.

Also, the carriage 133 is provided with sub-tanks 135 for each color configured to supply each color ink to the recording head 134. Each sub-tank 135 is supplied and replenished with the ink from the ink cartridge 200 loaded into the ink cartridge loading section 104, via a ink supply tube.

Meanwhile, as a paper feeding section configured to feed sheets of paper 142 loaded on a paper loading section (pressurizing plate) 141 of the paper feed tray 103, there are provided a half-moon roller (paper feeding roller 143) which feeds sheets of paper 142 one by one from the paper loading section 141, and a separation pad 144 which faces the paper feeding roller 143 and is formed of a material with a large friction coefficient. This separation pad 144 is biased toward the paper feeding roller 143 side.

As a conveyance section configured to convey the sheet of paper 142, which has been fed from this paper feeding section, underneath the recording head 134, there are provided a conveyance belt 151 configured to convey the sheet of paper 142 by means of electrostatic adsorption; a counter roller 152 configured to convey the sheet of paper 142, which is fed from the paper feeding section via a guide 145, while the sheet of paper is sandwiched between the counter roller and the conveyance belt 151; a conveyance guide 153 configured to make the sheet of paper 142, which is fed upward in the substantially vertical direction, change its direction by approximately 90° and thusly run along the conveyance belt 151; and an end pressurizing roller 155 biased toward the conveyance belt 151 side by a pressing member 154.

Also, there is provided a charging roller 156 as a charging unit configured to charge a surface of the conveyance belt 151. The conveyance belt 151 is an endless belt; and is capable of rotating around in a belt conveyance direction by stretching between a conveyance roller 157 and a tension roller 158. The conveyance belt 151 includes, for example, a surface layer serving as a paper adsorbing surface, which is formed of a resinous material such as an ethylene-tetrafluoroethylene copolymer (ETFE) having a thickness of approximately 40 μm for which resistance control has not been conducted; and a back layer (intermediate resistance layer, ground layer) which is formed of the same material as the surface layer, and for which resistance control has been conducted using carbon. On the back of the conveyance belt 151, a guide member 161 is placed correspondingly to a region where printing is carried out by the recording head 134.

Additionally, as a paper discharge section configured to discharge the sheet of paper 142 on which an image has been recorded by the recording head 134, there are provided a separation claw 171 configured to separate the sheet of paper 142 from the conveyance belt 151, a paper discharge roller 172, and a paper discharge roller 173, with the paper discharge tray 103 being placed below the paper discharge roller 172.

A double-sided paper feeding unit 181 is detachably mounted on a rear surface portion of the device main body 101. The double-sided paper feeding unit 181 takes in the sheet of paper 142 returned by rotation of the conveyance belt 151 in the opposite direction and reverses it, then refeeds it between the counter roller 152 and the conveyance belt 151. Additionally, a manual paper feeding section 182 is provided on an upper surface of the double-sided paper feeding unit 181.

In the inkjet recording device, the sheets of paper 142 are fed one by one from the paper feeding section, and the sheets of paper 142 fed upward in the substantially vertical direction is guided by the guide 145 and conveyed with being sandwiched between the conveyance belt 151 and the counter roller 152. Further, an end of the sheet of paper is guided by the conveyance guide 153 and pressed onto the conveyance belt 151 by the end pressurizing roller 155, so that the conveyance direction of the sheet of paper is changed by approximately 90°. On this occasion, the conveyance belt 151 is charged by the charging roller 156, and the sheet of paper 142 is electrostatically adsorbed onto the conveyance belt 151 and thusly conveyed. Here, by driving the recording head 134 according to an image signal while moving the carriage 133, ink droplets are ejected onto the sheet of paper 142 having stopped so as to perform recording for one line. Thereafter, the sheet of paper 142 is conveyed by a predetermined distance, and then recording for the next line is carried out.

On receipt of a recording completion signal or a signal indicating that a rear end of the sheet of paper 142 has reached a recording region, recording operation is finished, and the sheet of paper 142 is discharged onto the paper discharge tray 103. Once an amount of the ink remaining in the sub-tanks 135 has been detected as too small, a required amount of the ink is supplied from the ink cartridge 200 into the sub-tanks 135.

As for the inkjet recording device, when the ink in the ink cartridge 200 has been used up, it is possible to replace only the ink bag inside the ink cartridge by dismantling a housing of the ink cartridge 200. Also, even when the ink cartridge 200 is vertically mounted and employs a front-loading configuration, the ink can be supplied stably.

Therefore, even when the device main body 101 is installed with little space over it, for example when it is stored in a rack or when an object is placed over the device main body 101, the ink cartridge 200 can be easily replaced.

Note that, a serial (shuttle) type inkjet recording device in which the carriage is used for scanning and to which the present invention is applied is described above, but the present invention can be also applied to a line type inkjet recording device equipped with a line-type head.

The inkjet recording device of the present invention can be applied in various recording by the inkjet recording system, and can be particularly suitably applied to an inkjet recording printer, a facsimile, a photocopier, and a multi-function printer (printer-fax-copier).

(Ink Recorded Matter)

An ink recorded matter of the present invention includes an image recorded on a recording medium with an ink of the present invention. The ink recorded matter of the present invention has high image quality, is excellent in stability over time, and can be suitably used in various applications, for example, as material on which characters or images are recorded.

The recording medium is not particularly limited as long as it is a recording medium on which an ink of the present invention is impacted to thereby form an image. However, preferable is plain paper defined as follows.

That is, an ink of the present invention is preferably used for paper from which a Ca ion is eluted in an amount of $1.0\times10^{-4}$ [g/g] to $5.0\times10^{-4}$ [g/g]. When the amount is $1.0\times10^{-4}$ [g/g] or more, an effect of increasing image density is improved due to aggregation reaction with a pigment dispersing agent. When the amount is $5.0\times10^{-4}$ [g/g] or less, the ink is not prevented from being penetrated into paper, so that drying property of the ink, scratch resistance, and marker resistance are improved.

The amount of the Ca ion eluted from paper can be calculated according to, for example, the following method.

Specifically, a sheet of paper is cut into pieces of paper of 2.5 cm (±0.5 cm)×3.5 cm (±0.5 cm). The resultant pieces of paper are filtered through a 0.8 μm cellulose acetate filter (manufactured by Toyo Roshi Kaisha, Ltd.) with highly pure water to thereby remove a contaminant such as paper powder. Then, the pieces of paper are immersed in highly pure water to produce an immersion liquid, and quantified for a Ca ion contained in the immersion liquid with an ICP emission spectrophotometer to thereby obtain a Ca ion concentration [ppm]. The resultant Ca ion concentration [ppm] is multiplied by 200 g, which is a weight of the highly pure water, and divided by 16 g, which is a weight of the pieces of paper to be immersed, to thereby calculate the amount of the Ca ion [g/g].

Examples of the plain paper include MYPAPER (manufactured by Ricoh Company, Ltd., amount of Ca ion: $4.3\times10^{-4}$ [g/g]) and XEROX 4024 (manufactured by Fuji Xerox Co., Ltd., amount of Ca ion: $1.7\times10^{-4}$ [g/g]).

In addition to the plain paper, for example, coated paper for printing, glossy paper, and special paper may be used. These papers contain calcium carbonate, talc, kaolin, or aluminium sulfate (sulfate band). Accordingly, at a time when an ink of the present invention is impacted onto these papers, polyvalent metal ions, in particular, divalent or trivalent metal ions are eluted such as calcium, magnesium, or aluminium. That is, an ink of the present invention is reacted with the polyvalent metal ions to thereby cause aggregation of a pigment, which achieves high image density.

Many of loading materials, sizing agents, or fixing agents contained in the plain paper are water-insoluble metal salts. Only a small amount of water-soluble metal salt is contained, if any. Therefore, a smaller amount of polyvalent metal ion is eluted than paper of which surface is processed with a water-soluble polyvalent metal salt. This is why the effect of increasing image density could not be achieved in conventional technology.

In contrast, in the present invention, high image density can be achieved even in paper from which only a small amount of polyvalent metal ion is eluted (e.g., plain paper) as well as in the above-described processed paper.

EXAMPLES

The present invention will be described hereinafter in more detail with reference to Examples and Comparative Examples, but the present invention is not limited to Examples. Note that, "part(s)" and "%" in Examples are on a mass basis.

Synthesis of Copolymers 1 to 25

Copolymers 1 to 25 were synthesized as follows according to materials and contents described in lines of Synthetic Examples 1 to 25 in Table 1-1. Numerical values described in a column of content in Table 1-1 denote "parts by mass". Note that, styrene and methacrylic acid described in columns of Formulae (5) and (6) in Synthetic Examples 23 to 25 are different from monomers represented by Formulae (5)

and (6). Additionally, numerical values described in parentheses in a column of content of Formula (5) denote content of styrene.

Abbreviations of materials have the following meanings.

PHOSMER M: Acid phosphooxyethyl methacrylate (manufactured by Uni-Chemical Co., Ltd.)=a compound represented by (Formula 5-1)

DAAM: Diacetone acrylamide=a compound represented by (Formula 6-1)

P-1A: Acid phosphooxyethyl acrylate (manufactured by Kyoeisha Chemical Co., Ltd.)

PHOSMER PE: Acid phosphooxypolyoxy ethylene glycol monomethacrylate (manufactured by Uni-Chemical Co., Ltd.)

PHOSMER PP: Acid phosphooxypolyoxy propylene glycol monomethacrylate (manufactured by Uni-Chemical Co., Ltd.)

DMEA: Dimethyl ethanolamine

Note that, mass average molecular weights of Copolymers 1 to 25 described in Table were measured as follows.

The mass average molecular weights were measured by GPC method by means of a thermostat bath for column (CTO-20A, manufactured by Shimadzu Corporation), a detector (RID-10A, manufactured by Shimadzu Corporation), a pump for eluent flow channel (LC-20 AD, manufactured by Shimadzu Corporation), a degasser (DGU-20A, manufactured by Shimadzu Corporation), and an autosampler (SIL-20A, manufactured by Shimadzu Corporation). As for the column, the following were connected with each other: Aqueous SEC column TSKgelG3000PWXL (exclusion limit molecular weight: $2 \times 10^5$); TSKgelG5000PWXL (exclusion limit molecular weight: $2.5 \times 10^6$); and TSKgelG6000PWXL (exclusion limit molecular weight: $5 \times 10^7$) (all manufactured by Tosoh Corporation). A measurement sample was adjusted to a concentration of 2 g/100 mL with the use of an eluent. As for the eluent, an aqueous solution containing 0.5 mol/L of acetic acid and 0.5 mol/L of sodium acetate was used. A temperature of the column was 40° C., and the flow rate was 1.0 mL/min. A calibration curve was generated using, as standard samples, 9 polyethylene glycols having molecular weights of 1,065, 5,050, 24,000, 50,000, 107,000, 140,000, 250,000, 540,000, and 920,000. Based on the calibration curve, the mass average molecular weights were calculated.

Synthetic Example 1

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 15 parts of PHOSMER M and 85 parts of DAAM into 50 parts of ethanol and uniformly mixing together. The flask was heated under a nitrogen stream, and 1 part of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide so as to give the neutralization rate of 100%, to thereby obtain Copolymer 1.

Synthetic Example 2

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 5 parts of PHOSMER M and 95 parts of DAAM into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide so as to give the neutralization rate of 100%, to thereby obtain Copolymer 2.

Synthetic Example 3

A 1 L four-necked flask equipped with a reflux condenser, a thermometer, a pipe for nitrogen purge, and a stirrer was charged with 30 parts of PHOSMER M, 70 parts of DAAM, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 3.

Synthetic Example 4

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 55 parts of PHOSMER M and 45 parts of DAAM into 50 parts of ethanol and uniformly mixing together. The flask was heated under a nitrogen stream, and 1 part of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide so as to give the neutralization rate of 100%, to thereby obtain Copolymer 4.

Synthetic Example 5

A 1 L five-necked flask equipped with a reflux condenser, a thermometer, a pipe for nitrogen purge, a dropping funnel, and a stirrer was charged with 250 parts of ethanol. Then, the dropping funnel was charged with a mixed solution produced by dissolving 65 parts of PHOSMER M and 35 parts of DAAM into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide so as to give the neutralization rate of 100%, to thereby obtain Copolymer 5.

Synthetic Example 6

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 55 parts of PHOSMER M and 45 parts of DAAM into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide so as to give the neutralization rate of 100%, to thereby obtain Copolymer 6.

Synthetic Example 7

A 1 L four-necked flask equipped with a reflux condenser, a thermometer, a pipe for nitrogen purge, and a stirrer was charged with 55 parts of PHOSMER M, 45 parts of DAAM, and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 7.

Synthetic Example 8

A 1 L four-necked flask equipped with a reflux condenser, a thermometer, a pipe for nitrogen purge, and a stirrer was charged with 65 parts of PHOSMER M, 35 parts of DAAM, and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 8.

Synthetic Example 9

A 1 L four-necked flask equipped with a reflux condenser, a thermometer, a pipe for nitrogen purge, and a stirrer was charged with 55 parts of PHOSMER M, 45 parts of DAAM, and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 9.

Synthetic Example 10

A 1 L four-necked flask equipped with a reflux condenser, a thermometer, a pipe for nitrogen purge, and a stirrer was charged with 15 parts of PHOSMER M, 85 parts of DAAM, and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 10.

Synthetic Example 11

A 1 L four-necked flask equipped with a reflux condenser, a thermometer, a pipe for nitrogen purge, and a stirrer was charged with 5 parts of PHOSMER M, 95 parts of DAAM, and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 11.

Synthetic Example 12

A 1 L four-necked flask equipped with a reflux condenser, a thermometer, a pipe for nitrogen purge, and a stirrer was charged with 15 parts of PHOSMER M, 85 parts of DAAM, and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 12.

Synthetic Example 13

A 1 L five-necked flask equipped with a reflux condenser, a thermometer, a pipe for nitrogen purge, a dropping funnel, and a stirrer was charged with 20 parts of ethanol. Then, the dropping funnel was charged with a mixed solution produced by dissolving 15 parts of PHOSMER M and 85 parts of DAAM into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with sodium hydroxide so as to give the neutralization rate of 100%, to thereby obtain Copolymer 13.

Synthetic Example 14

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 15 parts of PHOSMER M and 85 parts of DAAM into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with lithium hydroxide so as to give the neutralization rate of 100%, to thereby obtain Copolymer 14.

Synthetic Example 15

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 5 parts of PHOSMER M and 95 parts of DAAM into 50 parts of ethanol and uniformly mixing together. The flask was heated under a nitrogen stream, and 1 part of a radical polymerization initiator was added thereto at 70° C. The mixed solution which had been charged in the dropping funnel was added dropwise to the flask for 2 hours, followed by allowing to react together for 3 hours while keeping a temperature at 70° C. After termination of the reaction, the resultant reaction product was neutralized with potassium hydroxide so as to give the neutralization rate of 100%, to thereby obtain Copolymer 15.

Synthetic Example 16

A 1 L four-necked flask equipped with a reflux condenser, a thermometer, a pipe for nitrogen purge, and a stirrer was charged with 65 parts of PHOSMER M, 35 parts of DAAM, and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 16.

Synthetic Example 17

A 1 L four-necked flask equipped with a reflux condenser, a thermometer, a pipe for nitrogen purge, and a stirrer was charged with 30 parts of P-1A, 70 parts of DAAM, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 17.

Synthetic Example 18

A 1 L four-necked flask equipped with a reflux condenser, a thermometer, a pipe for nitrogen purge, and a stirrer was charged with 30 parts of PHOSMER PE, 70 parts of DAAM, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 18.

Synthetic Example 19

A 1 L four-necked flask equipped with a reflux condenser, a thermometer, a pipe for nitrogen purge, and a stirrer was charged with 30 parts of PHOSMER PP, 70 parts of DAAM, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 19.

Synthetic Example 20

A 1 L four-necked flask equipped with a reflux condenser, a thermometer, a pipe for nitrogen purge, and a stirrer was charged with 30 parts of the monomer represented by (Formula 3-5), 70 parts of DAAM, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 20.

Synthetic Example 21

A 1 L four-necked flask equipped with a reflux condenser, a thermometer, a pipe for nitrogen purge, and a stirrer was charged with 30 parts of PHOSMER M, 70 parts of DAAM, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give 50% of the neutralization rate, to thereby obtain Copolymer 21.

Synthetic Example 22

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 15 parts of PHOSMER M and 85 parts of DAAM into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with dimethylethanolamine so as to give the neutralization rate of 100%, to thereby obtain Copolymer 22.

Synthetic Example 23

Comparative Synthetic Example 1

A 1 L four-necked flask equipped with a reflux condenser, a thermometer, a pipe for nitrogen purge, and a stirrer was charged with 15 parts of styrene, 85 parts of DAAM, and 100 parts of ethanol. The flask was heated under a nitrogen stream, and 0.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 23.

Synthetic Example 24

Comparative Synthetic Example 2

A 1 L five-necked flask equipped with a reflux condenser, a thermometer, a pipe for nitrogen purge, a dropping funnel, and a stirrer was charged with 200 parts of ethanol. Then, the dropping funnel was charged with a mixed solution produced by dissolving 15 parts of PHOSMER M and 85 parts of methacrylic acid into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide so as to give the neutralization rate of 100%, to thereby obtain Copolymer 24.

Synthetic Example 25

Comparative Synthetic Example 3

A 1 L four-necked flask equipped with a reflux condenser, a thermometer, a pipe for nitrogen purge, and a stirrer was charged with 15 parts of styrene, 85 parts of methacrylic acid, and 100 parts of ethanol. The flask was heated under a nitrogen stream, and 0.2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer 25.

TABLES 1-1

|  |  | Monomer | | Content |
|---|---|---|---|---|
|  |  | (Formula 5) | (Formula 6) | (Formula 5) |
| Syn. Ex. 1 | Copolymer 1 | PHOSMER M | DAAM | 15 |
| Syn. Ex. 2 | Copolymer 2 | PHOSMER M | DAAM | 5 |
| Syn. Ex. 3 | Copolymer 3 | PHOSMER M | DAAM | 30 |
| Syn. Ex. 4 | Copolymer 4 | PHOSMER M | DAAM | 55 |
| Syn. Ex. 5 | Copolymer 5 | PHOSMER M | DAAM | 65 |
| Syn. Ex. 6 | Copolymer 6 | PHOSMER M | DAAM | 55 |
| Syn. Ex. 7 | Copolymer 7 | PHOSMER M | DAAM | 55 |
| Syn. Ex. 8 | Copolymer 8 | PHOSMER M | DAAM | 65 |
| Syn. Ex. 9 | Copolymer 9 | PHOSMER M | DAAM | 55 |
| Syn. Ex. 10 | Copolymer 10 | PHOSMER M | DAAM | 15 |
| Syn. Ex. 11 | Copolymer 11 | PHOSMER M | DAAM | 5 |
| Syn. Ex. 12 | Copolymer 12 | PHOSMER M | DAAM | 15 |
| Syn. Ex. 13 | Copolymer 13 | PHOSMER M | DAAM | 15 |
| Syn. Ex. 14 | Copolymer 14 | PHOSMER M | DAAM | 15 |
| Syn. Ex. 15 | Copolymer 15 | PHOSMER M | DAAM | 5 |
| Syn. Ex. 16 | Copolymer 16 | PHOSMER M | DAAM | 65 |
| Syn. Ex. 17 | Copolymer 17 | P-1A | DAAM | 30 |
| Syn. Ex. 18 | Copolymer 18 | PHOSMER PE | DAAM | 30 |
| Syn. Ex. 19 | Copolymer 19 | PHOSMER PP | DAAM | 30 |
| Syn. Ex. 20 | Copolymer 20 | (Formula 5-5) | DAAM | 30 |
| Syn. Ex. 21 | Copolymer 21 | PHOSMER M | DAAM | 30 |
| Syn. Ex. 22 | Copolymer 22 | PHOSMER M | DAAM | 15 |
| Syn. Ex. 23 | Copolymer 23 | Styrene | DAAM | (15) |
| Syn. Ex. 24 | Copolymer 24 | PHOSMER M | Methacrylic acid | 15 |
| Syn. Ex. 25 | Copolymer 25 | Styrene | Methacrylic acid | (15) |

* In Table 1-1, (Formula 5) and (Formula 6) denote monomers represented by the General Formulae (5) and (6), respectively.

TABLE 1-2

|  | Mass average molecular weight | Counter ion | Neutralization rate (%) |
|---|---|---|---|
| Syn. Ex. 1 | 3,000 | K | 100 |
| Syn. Ex. 2 | 7,000 | K | 100 |
| Syn. Ex. 3 | 30,000 | K | 100 |
| Syn. Ex. 4 | 3,000 | K | 100 |
| Syn. Ex. 5 | 7,000 | K | 100 |
| Syn. Ex. 6 | 7,000 | K | 100 |
| Syn. Ex. 7 | 60,000 | K | 100 |
| Syn. Ex. 8 | 45,000 | K | 100 |
| Syn. Ex. 9 | 45,000 | K | 100 |
| Syn. Ex. 10 | 60,000 | K | 100 |
| Syn. Ex. 11 | 45,000 | K | 100 |
| Syn. Ex. 12 | 45,000 | K | 100 |
| Syn. Ex. 13 | 7,000 | Na | 100 |
| Syn. Ex. 14 | 7,000 | Li | 100 |
| Syn. Ex. 15 | 3,000 | K | 100 |
| Syn. Ex. 16 | 60,000 | K | 100 |
| Syn. Ex. 17 | 30,000 | K | 100 |
| Syn. Ex. 18 | 30,000 | K | 100 |
| Syn. Ex. 19 | 30,000 | K | 100 |
| Syn. Ex. 20 | 30,000 | K | 100 |
| Syn. Ex. 21 | 30,000 | K/H | 50 |
| Syn. Ex. 22 | 7,000 | DMEA | 100 |
| Syn. Ex. 23 | 7,000 | K | 100 |
| Syn. Ex. 24 | 7,000 | K | 100 |
| Syn. Ex. 25 | 10,000 | K | 100 |

<Preparation of Pigment Dispersions 1 to 30>

Firstly, each of Copolymers, a pigment, and pure water were pre-mixed together using materials described in each of columns of Pigment dispersions 1 to 30 in Tables 2-1 to 3-2, to thereby produce mixed slurry. Then, the mixed slurry was subjected to circulation dispersion with a disc-type media mill (MODEL DMR, manufactured by Ashizawa Finetech Ltd.) and 0.05 mm zirconia beads (packing rate: 55%) at a circumferential speed of 10 m/s and a liquid temperature of 10° C. for 3 min, followed by centrifugation with a centrifuge (MODEL-7700, manufactured by KUBOTA CORPORATION) to remove coarse particles, to thereby obtain Pigment dispersion. Numerical values described in Tables 2-1 to 3-2 denote blending ratios (parts by weight).

Note that, each of Copolymers 1 to 25 was dried to remove a solvent therein, and then, the resultant solid matter was dissolved into water so as to give a 20% aqueous solution, which was used as Copolymer. Materials other than Copolymers will be described in detail.

Carbon black (NIPEX160, manufactured by Degussa AG, BET specific surface area: 150 $m^2/g$, average primary particle diameter: 20 nm, pH 4.0, DBP oil absorption amount: 620 g/100 g)

Pigment Blue 15:3 (CHROMOFINE BLUE-A-220JC, manufactured by Dainichiseika Color & Chemicals Mfg. Co., Ltd.)

Pigment Red 122 (TONER MAGENTA E002, manufactured by Clariant International Ltd.)

Pigment Yellow 74 (FAST YELLOW 531, manufactured by Dainichiseika Color & Chemicals Mfg. Co., Ltd.)

TABLE 2-1

|  | Pigment dispersion | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Copolymer 1 |  |  |  |  |  |  | 20 |  |  |  |
| Copolymer 2 |  |  |  |  |  |  |  | 20 |  |  |
| Copolymer 3 | 10 | 20 | 80 | 20 | 20 | 20 |  |  |  |  |
| Copolymer 4 |  |  |  |  |  |  |  |  | 20 |  |
| Copolymer 5 |  |  |  |  |  |  |  |  |  | 20 |
| Copolymer 6 |  |  |  |  |  |  |  |  |  |  |
| Copolymer 7 |  |  |  |  |  |  |  |  |  |  |
| Copolymer 8 |  |  |  |  |  |  |  |  |  |  |
| Copolymer 9 |  |  |  |  |  |  |  |  |  |  |
| Carbon black | 16 | 16 | 16 |  |  |  | 16 | 16 | 16 | 16 |
| Pigment Blue 15:3 |  |  |  | 16 |  |  |  |  |  |  |
| Pigment Red 122 |  |  |  |  | 16 |  |  |  |  |  |
| Pigment Yellow 74 |  |  |  |  |  | 16 |  |  |  |  |
| Pure water | Bal. | Bal. | Bal. | Bal. | Bal. | Bal. | Bal. | Bal. | Bal. | Bal. |
| Total | 100 | 100 | 100 | 100 | 100 | 100 | 100 | 100 | 100 | 100 |

TABLE 2-2

|  | Pigment dispersion | | | |
| --- | --- | --- | --- | --- |
|  | 11 | 12 | 13 | 14 |
| Copolymer 1 |  |  |  |  |
| Copolymer 2 |  |  |  |  |
| Copolymer 3 |  |  |  |  |
| Copolymer 4 |  |  |  |  |
| Copolymer 5 |  |  |  |  |
| Copolymer 6 | 20 |  |  |  |
| Copolymer 7 |  | 20 |  |  |
| Copolymer 8 |  |  | 20 |  |
| Copolymer 9 |  |  |  | 20 |
| Carbon black | 16 | 16 | 16 | 16 |
| Pigment Blue 15:3 |  |  |  |  |
| Pigment Red 122 |  |  |  |  |
| Pigment Yellow 74 |  |  |  |  |
| Pure water | Bal. | Bal. | Bal. | Bal. |
| Total | 100 | 100 | 100 | 100 |

TABLE 3-1

|  | Pigment dispersion | | | | | | | | | |
| --- | --- | --- | --- | --- | --- | --- | --- | --- | --- | --- |
|  | 15 | 16 | 17 | 18 | 19 | 20 | 21 | 22 | 23 | 24 |
| Copolymer 10 | 20 |  |  |  |  |  |  |  |  |  |
| Copolymer 11 |  | 20 |  |  |  |  |  |  |  |  |
| Copolymer 12 |  |  | 20 |  |  |  |  |  |  |  |
| Copolymer 13 |  |  |  | 20 |  |  |  |  |  |  |
| Copolymer 14 |  |  |  |  | 20 |  |  |  |  |  |
| Copolymer 15 |  |  |  |  |  | 20 |  |  |  |  |
| Copolymer 16 |  |  |  |  |  |  | 20 |  |  |  |
| Copolymer 17 |  |  |  |  |  |  |  | 20 |  |  |
| Copolymer 18 |  |  |  |  |  |  |  |  | 20 |  |
| Copolymer 19 |  |  |  |  |  |  |  |  |  | 20 |
| Copolymer 20 |  |  |  |  |  |  |  |  |  |  |
| Copolymer 21 |  |  |  |  |  |  |  |  |  |  |
| Copolymer 22 |  |  |  |  |  |  |  |  |  |  |
| Copolymer 23 |  |  |  |  |  |  |  |  |  |  |
| Copolymer 24 |  |  |  |  |  |  |  |  |  |  |
| Copolymer 25 |  |  |  |  |  |  |  |  |  |  |
| Carbon black | 16 | 16 | 16 | 16 | 16 | 16 | 16 | 16 | 16 | 16 |
| Pigment Blue 15:3 |  |  |  |  |  |  |  |  |  |  |
| Pigment Red 122 |  |  |  |  |  |  |  |  |  |  |
| Pigment Yellow 74 |  |  |  |  |  |  |  |  |  |  |
| Pure water | Bal. | Bal. | Bal. | Bal. | Bal. | Bal. | Bal. | Bal. | Bal. | Bal. |
| Total | 100 | 100 | 100 | 100 | 100 | 100 | 100 | 100 | 100 | 100 |

TABLE 3-2

| | Pigment dispersion | | | | | |
|---|---|---|---|---|---|---|
| | 25 | 26 | 27 | 28 | 29 | 30 |
| Copolymer 10 | | | | | | |
| Copolymer 11 | | | | | | |
| Copolymer 12 | | | | | | |
| Copolymer 13 | | | | | | |
| Copolymer 14 | | | | | | |
| Copolymer 15 | | | | | | |
| Copolymer 16 | | | | | | |
| Copolymer 17 | | | | | | |
| Copolymer 18 | | | | | | |
| Copolymer 19 | | | | | | |
| Copolymer 20 | 20 | | | | | |
| Copolymer 21 | | 20 | | | | |
| Copolymer 22 | | | 20 | | | |
| Copolymer 23 | | | | 20 | | |
| Copolymer 24 | | | | | 20 | |
| Copolymer 25 | | | | | | 20 |
| Carbon black | 16 | 16 | 16 | 16 | 16 | 16 |
| Pigment Blue 15:3 | | | | | | |
| Pigment Red 122 | | | | | | |
| Pigment Yellow 74 | | | | | | |
| Pure water | Bal. | Bal. | Bal. | Bal. | Bal. | Bal. |
| Total | 100 | 100 | 100 | 100 | 100 | 100 |

[Examples 1 to 29 and Comparative Examples 1 to 3]

<Production of Ink>

Materials described in each of columns of Examples 1 to 29 and Comparative Examples 1 to 3 in Tables 4-1 to 5-2 were mixed and stirred for 1 hour to thereby produce a uniform dispersion. The resultant dispersion was subjected to pressure filtration with a polyvinylidene fluoride membrane filter having an average pore diameter of 5.0 μm to remove coarse particles and contaminants, to thereby obtain an ink.

Note that, numerical values described in Tables denote % by mass.

TABLE 4-1

| Material | | | Example | | | | | | | |
|---|---|---|---|---|---|---|---|---|---|---|
| | name | Copolymer | 1 | 2 | 3 | 4 | 5 | 6 | 7 | 8 |
| Pigment dispersion | Pigment dispersion 1 | Copolymer 3 | 50 | | | | | | | |
| | Pigment dispersion 2 | Copolymer 3 | | 50 | 50 | 50 | | | | |
| | Pigment dispersion 3 | Copolymer 3 | | | | | 50 | | | |
| | Pigment dispersion 4 | Copolymer 3 | | | | | | 30 | | |
| | Pigment dispersion 5 | Copolymer 3 | | | | | | | 30 | |
| | Pigment dispersion 6 | Copolymer 3 | | | | | | | | 50 |
| | Pigment dispersion 7 | Copolymer 1 | | | | | | | | |
| | Pigment dispersion 8 | Copolymer 2 | | | | | | | | |
| | Pigment dispersion 9 | Copolymer 4 | | | | | | | | |
| | Pigment dispersion 10 | Copolymer 5 | | | | | | | | |
| | Pigment dispersion 11 | Copolymer 6 | | | | | | | | |
| | Pigment dispersion 12 | Copolymer 7 | | | | | | | | |
| | Pigment dispersion 13 | Copolymer 8 | | | | | | | | |
| Water-soluble Organic solvent | Glycerin | | 10 | 10 | | 20 | 10 | 10 | 10 | 10 |
| | 1,3-Butanediol | | 20 | 20 | 30 | | 20 | 20 | 20 | 20 |
| | Trimethylol propane | | | | | 5 | | | | |
| | 2-Pyrrolidone | | | | | 5 | | | | |
| | Pure water | | Bal. | Bal. | Bal. | Bal. | Bal. | Bal. | Bal. | Bal. |
| Total | | | 100 | 100 | 100 | 100 | 100 | 100 | 100 | 100 |

TABLE 4-2

| | Material name | Copolymer | Example 9 | 10 | 11 | 12 | 13 | 14 | 15 |
|---|---|---|---|---|---|---|---|---|---|
| Pigment dispersion | Pigment dispersion 1 | Copolymer 3 | | | | | | | |
| | Pigment dispersion 2 | Copolymer 3 | | | | | | | |
| | Pigment dispersion 3 | Copolymer 3 | | | | | | | |
| | Pigment dispersion 4 | Copolymer 3 | | | | | | | |
| | Pigment dispersion 5 | Copolymer 3 | | | | | | | |
| | Pigment dispersion 6 | Copolymer 3 | | | | | | | |
| | Pigment dispersion 7 | Copolymer 1 | 50 | | | | | | |
| | Pigment dispersion 8 | Copolymer 2 | | 50 | | | | | |
| | Pigment dispersion 9 | Copolymer 4 | | | 50 | | | | |
| | Pigment dispersion 10 | Copolymer 5 | | | | 50 | | | |
| | Pigment dispersion 11 | Copolymer 6 | | | | | 50 | | |
| | Pigment dispersion 12 | Copolymer 7 | | | | | | 50 | |
| | Pigment dispersion 13 | Copolymer 8 | | | | | | | 50 |
| Water-soluble Organic solvent | Glycerin | | 10 | 10 | 10 | 10 | 10 | 10 | 10 |
| | 1,3-Butanediol | | 20 | 20 | 20 | 20 | 20 | 20 | 20 |
| | Trimethylol propane | | | | | | | | |
| | 2-Pyrroridone | | | | | | | | |
| | Pure water | | Bal. | Bal. | Bal. | Bal. | Bal. | Bal. | Bal. |
| | Total | | 100 | 100 | 100 | 100 | 100 | 100 | 100 |

TABLE 5-1

| | Material name | Copolymer | Example 16 | 17 | 18 | 19 | 20 | 21 | 22 | 23 | 24 |
|---|---|---|---|---|---|---|---|---|---|---|---|
| Pigment dispersion | Pigment dispersion 14 | Copolymer 9 | 50 | | | | | | | | |
| | Pigment dispersion 15 | Copolymer 10 | | 50 | | | | | | | |
| | Pigment dispersion 16 | Copolymer 11 | | | 50 | | | | | | |
| | Pigment dispersion 17 | Copolymer 12 | | | | 50 | | | | | |
| | Pigment dispersion 18 | Copolymer 13 | | | | | 50 | | | | |
| | Pigment dispersion 19 | Copolymer 14 | | | | | | 50 | | | |
| | Pigment dispersion 20 | Copolymer 15 | | | | | | | 50 | | |
| | Pigment dispersion 21 | Copolymer 16 | | | | | | | | 50 | |
| | Pigment dispersion 22 | Copolymer 17 | | | | | | | | | 50 |
| | Pigment dispersion 23 | Copolymer 18 | | | | | | | | | |
| | Pigment dispersion 24 | Copolymer 19 | | | | | | | | | |
| | Pigment dispersion 25 | Copolymer 20 | | | | | | | | | |
| | Pigment dispersion 26 | Copolymer 21 | | | | | | | | | |
| | Pigment dispersion 27 | Copolymer 22 | | | | | | | | | |
| | Pigment dispersion 28 | Copolymer 23 | | | | | | | | | |

TABLE 5-1-continued

| Material name | | Copolymer | Example 16 | 17 | 18 | 19 | 20 | 21 | 22 | 23 | 24 |
|---|---|---|---|---|---|---|---|---|---|---|---|
| | Pigment dispersion 29 | Copolymer 24 | | | | | | | | | |
| | Pigment dispersion 30 | Copolymer 25 | | | | | | | | | |
| Water-soluble Organic solvent | Glycerin | | 10 | 10 | 10 | 10 | 10 | 10 | 10 | 10 | 10 |
| | 1,3-Butanediol | | 20 | 20 | 20 | 20 | 20 | 20 | 20 | 20 | 20 |
| | Trimethylol propane | | | | | | | | | | |
| | 2-Pyrrolidone | | | | | | | | | | |
| | Pure water | | Bal. | Bal. | Bal. | Bal. | Bal. | Bal. | Bal. | Bal. | Bal. |
| Total | | | 100 | 100 | 100 | 100 | 100 | 100 | 100 | 100 | 100 |

TABLE 5-2

| Material name | | Copolymer | Example 25 | 26 | 27 | 28 | 29 | Comp. Ex. 1 | 2 | 3 |
|---|---|---|---|---|---|---|---|---|---|---|
| Pigment dispersion | Pigment dispersion 14 | Copolymer 9 | | | | | | | | |
| | Pigment dispersion 15 | Copolymer 10 | | | | | | | | |
| | Pigment dispersion 16 | Copolymer 11 | | | | | | | | |
| | Pigment dispersion 17 | Copolymer 12 | | | | | | | | |
| | Pigment dispersion 18 | Copolymer 13 | | | | | | | | |
| | Pigment dispersion 19 | Copolymer 14 | | | | | | | | |
| | Pigment dispersion 20 | Copolymer 15 | | | | | | | | |
| | Pigment dispersion 21 | Copolymer 16 | | | | | | | | |
| | Pigment dispersion 22 | Copolymer 17 | | | | | | | | |
| | Pigment dispersion 23 | Copolymer 18 | 50 | | | | | | | |
| | Pigment dispersion 24 | Copolymer 19 | | 50 | | | | | | |
| | Pigment dispersion 25 | Copolymer 20 | | | 50 | | | | | |
| | Pigment dispersion 26 | Copolymer 21 | | | | 50 | | | | |
| | Pigment dispersion 27 | Copolymer 22 | | | | | 50 | | | |
| | Pigment dispersion 28 | Copolymer 23 | | | | | | 50 | | |
| | Pigment dispersion 29 | Copolymer 24 | | | | | | | 50 | |
| | Pigment dispersion 30 | Copolymer 25 | | | | | | | | 50 |
| Water-soluble Organic solvent | Glycerin | | 10 | 10 | 10 | 10 | 10 | 10 | 10 | 10 |
| | 1,3-Butanediol | | 20 | 20 | 20 | 20 | 20 | 20 | 20 | 20 |
| | Trimethylol propane | | | | | | | | | |
| | 2-Pyrrolidone | | | | | | | | | |
| | Pure water | | Bal. | Bal. | Bal. | Bal. | Bal. | Bal. | Bal. | Bal. |
| Total | | | 100 | 100 | 100 | 100 | 100 | 100 | 100 | 100 |

The Pigment dispersions 1 to 30, and inks of Examples 1 to 29, and Comparative Examples 1 to 3 were evaluated for viscosity and storage stability. Additionally, the inks also evaluated for image density.

<Storage Stability>

The Pigment dispersions and inks were measured for viscosity. Storage stability was evaluated by using the viscosity as an index.

The viscosity was measured at 25° C. by means of a viscometer (RE500L, manufactured by Toki Sangyo Co., Ltd.) equipped with a rotor of which rotation speed had been adjusted in accordance with a sample. Results are shown in Tables 6-1 and 6-2.

Initial viscosities after production of the Pigment dispersions and inks also were measured, which was evaluated according to the following criteria. Then, the Pigment dispersions and inks were sealed into polyethylene containers and stored at 70° C. for 1 week. Thereafter, the viscosities of the Pigment dispersions and inks were measured again. Storage stability was evaluated according to the following criteria based on a rate of change in viscosity after storage relative to the initial viscosity. Evaluation results are shown in Tables 6-1 and 6-2.

[Evaluation Criteria of Pigment Dispersion]
Initial Viscosity
A: Initial viscosity was less than 7 mPa·s.
B: Initial viscosity was 7 mPa·s or more but less than 20 mPa·s.
C: Initial viscosity was 20 mPa·s or more.
Storage Stability
A: Rate of change in viscosity after storage was less than 2%.
B: Rate of change in viscosity after storage was 2% or more but less than 5%.
C: Rate of change in viscosity after storage was 5% or more but less than 10%.
D: Rate of change in viscosity after storage was 10% or more but less than 50%.
E: Rate of change in viscosity after storage was 50% or more.

[Evaluation Criteria of Ink]
A: Initial viscosity was less than 9 mPa·s.
B: Initial viscosity was 9 mPa·s or more but less than 20 mPa·s.
C: Initial viscosity was 20 mPa·s or more.
Storage Stability
A: Rate of change in viscosity after storage was less than 2%.
B: Rate of change in viscosity after storage was 2% or more but less than 5%.
C: Rate of change in viscosity after storage was 5% or more but less than 10%.
D: Rate of change in viscosity after storage was 10% or more but less than 50%.
E: Rate of change in viscosity after storage was 50% or more.

<Image Density>

An inkjet printer (IPSIO GX3000, manufactured by Ricoh Company, Ltd.) was set by varying a driving voltage of a piezo element to unify an amount of an ink to be ejected, so that the same amount of the ink would be deposited on each recording medium.

A chart including a 64-point general symbol according to JIS X 0208 (1997), 2223 of black and each color produced using Microsoft Word 2003 was printed on a sheet of paper (MYPAPER, manufactured by Ricoh Company, Ltd., wood free paper having a basis weight of 69.6 g/m$^2$, a sizing degree of 23.2 second, and an air permeability of 21.0 second).

Then, the color in the general symbol according to JIS X 0208 (1997), 2223 was measured by X-Rite 938 (manufactured by X-Rite Inc.), and the image density of each of the measured colors was evaluated based on the following evaluation criteria. Here, a printing mode of the inkjet printer was set to "Plain Paper-High Speed." Note that, the general symbol according to JIS X 0208 (1997), 2223 is a square shaped symbol inside of which is painted out with an ink. Evaluation results are shown in Tables 6-1 and 6-2.

[Evaluation Criteria]

| | | |
|---|---|---|
| A: | OD value | Black: 1.30 or more |
| | | Yellow: 0.75 or more |
| | | Magenta: 0.90 or more |
| | | Cyan: 1.00 or more |
| B: | OD value | Black: 1.20 or more but less than 1.30 |
| | | Yellow: 0.70 or more but less than 0.75 |
| | | Magenta: 0.85 or more but less than 0.90 |
| | | Cyan: 0.90 or more but less than 1.00 |
| C: | OD value | Black: 1.10 or more but less than 1.20 |
| | | Yellow: 0.65 or more but less than 0.70 |
| | | Magenta: 0.70 or more but less than 0.85 |
| | | Cyan: 0.80 or more but less than 0.90 |
| D: | OD value | Black: 1.00 or more but less than 1.10 |
| | | Yellow: 0.60 or more but less than 0.65 |
| | | Magenta: 0.65 or more but less than 0.70 |
| | | Cyan: 0.70 or more but less than 0.80 |
| E: | OD value | Black: less than 1.00 |
| | | Yellow: less than 0.60 |
| | | Magenta: less than 0.65 |
| | | Cyan: less than 0.70 |

TABLE 6-1

| | Copolymer | *1 | Mw | Pigment dispersion Initial viscosity | Pigment dispersion Storage stability | Ink Initial viscosity | Ink Storage stability | Image density |
|---|---|---|---|---|---|---|---|---|
| Ex. 1 | Copolymer 3 | 30 | 30,000 | A | C | B | C | B |
| Ex. 2 | Copolymer 3 | 30 | 30,000 | A | B | B | C | B |
| Ex. 3 | Copolymer 3 | 30 | 30,000 | A | B | B | C | B |
| Ex. 4 | Copolymer 3 | 30 | 30,000 | A | B | B | C | B |
| Ex. 5 | Copolymer 3 | 30 | 30,000 | B | B | B | C | B |
| Ex. 6 | Copolymer 3 | 30 | 30,000 | A | B | B | C | B |
| Ex. 7 | Copolymer 3 | 30 | 30,000 | A | B | B | C | B |
| Ex. 8 | Copolymer 3 | 30 | 30,000 | A | B | B | C | B |
| Ex. 9 | Copolymer 1 | 15 | 3,000 | A | B | B | C | C |
| Ex. 10 | Copolymer 2 | 5 | 7,000 | A | B | B | C | C |
| Ex. 11 | Copolymer 4 | 55 | 3,000 | A | B | B | C | C |
| Ex. 12 | Copolymer 5 | 65 | 7,000 | B | B | B | C | B |
| Ex. 13 | Copolymer 6 | 55 | 7,000 | A | B | B | C | B |
| Ex. 14 | Copolymer 7 | 55 | 60,000 | B | B | B | C | B |
| Ex. 15 | Copolymer 8 | 65 | 45,000 | A | C | B | C | B |
| Ex. 16 | Copolymer 9 | 55 | 45,000 | A | B | B | C | B |
| Ex. 17 | Copolymer 10 | 15 | 60,000 | A | C | B | C | B |
| Ex. 18 | Copolymer 11 | 5 | 45,000 | A | B | B | C | C |
| Ex. 19 | Copolymer 12 | 15 | 45,000 | A | B | B | C | B |

TABLE 6-1-continued

|  | Copolymer | *1 | Mw | Pigment dispersion Initial viscosity | Pigment dispersion Storage stability | Ink Initial viscosity | Ink Storage stability | Image density |
|---|---|---|---|---|---|---|---|---|
| Ex. 20 | Copolymer 13 | 15 | 7,000 | B | B | A | B | B |
| Ex. 21 | Copolymer 14 | 15 | 7,000 | B | B | A | B | B |
| Ex. 22 | Copolymer 15 | 5 | 3,000 | B | C | B | C | C |
| Ex. 23 | Copolymer 16 | 65 | 60,000 | A | B | B | C | B |

TABLE 6-2

|  | Copolymer | *1 | Mw | Pigment dispersion Initial viscosity | Pigment dispersion Storage stability | Ink Initial viscosity | Ink Storage stability | Image density |
|---|---|---|---|---|---|---|---|---|
| Ex. 24 | Copolymer 17 | 30 | 30,000 | A | B | B | C | B |
| Ex. 25 | Copolymer 18 | 30 | 30,000 | A | B | B | C | B |
| Ex. 26 | Copolymer 19 | 30 | 30,000 | A | B | B | C | B |
| Ex. 27 | Copolymer 20 | 30 | 30,000 | A | B | B | C | B |
| Ex. 28 | Copolymer 21 | 30 | 30,000 | A | B | B | C | B |
| Ex. 29 | Copolymer 22 | 30 | 30,000 | B | B | A | B | B |
| Comp. Ex. 1 | Copolymer 23 | (15) | 7,000 | B | C | B | C | E |
| Comp. Ex. 2 | Copolymer 24 | 15 | 7,000 | C | E | C | E | C |
| Comp. Ex. 3 | Copolymer 25 | (15) | 10,000 | B | E | B | E | E |

In Tables 6-1 and 6-2, *1 denotes "(Formula 1) structural unit content (%)" which means a percentage of the structural unit represented by the General Formula (1) in the phosphate group-containing copolymer, and Mw denotes the mass average molecular weight.

As can be seen from Tables 6-1 and 6-2, when comparing Examples 1 to 29 with Comparative Examples 1 to 3, inks which contain a phosphate group-containing copolymer of the present invention are more excellent in both of image density and storage stability.

Additionally, it can be seen that Examples in which the structural unit represented by the General Formula (1) is contained in a percentage of 10% by mass to 60% by mass are more excellent in both of image density and storage stability than other Examples.

It can be seen that Examples in which the copolymer has a molecular weight of 5,000 to 50,000 are more excellent in both of image density and storage stability than other Examples.

<Synthesis of Copolymers A1 to A45>

Copolymers A1 to A45 were synthesized as follows according to materials and contents described in lines of Synthetic Examples A1 to A45 in Tables A1-1 and A1-2. Numerical values described in columns of content in Table A1-2 denote "parts by mass". Additionally, numerical values described in parentheses in columns of content of F (5) or F (6) in Synthetic Examples A40 to A42 denote content of styrene or methacrylic acid. Abbreviations of materials have the following meanings.

PHOSMER M: Acid phosphooxyethyl methacrylate (manufactured by Uni-Chemical Co., Ltd.)=a compound represented by (Formula 5-1)

DAAM: Diacetone acrylamide=a compound represented by (Formula 6-1)

DAMAM: Diacetone methacrylamide=a compound represented by (Formula 6-2)

StA: Stearyl acrylate=a compound represented by (Formula 7-1)

StMA: Stearyl methacrylate=a compound represented by (Formula 7-2)

BzA: Benzyl acrylate=a compound represented by (Formula 8-1)

BzMA: Benzyl methacrylate=a compound represented by (Formula 8-2)

P-1A: Acid phosphooxyethyl acrylate (manufactured by Kyoeisha Chemical Co., Ltd.)

PHOSMER PE: Acid phosphooxypolyoxy ethylene glycol monomethacrylate (manufactured by Uni-Chemical Co., Ltd.)

PHOSMER PP: Acid phosphooxypolyoxy propylene glycol monomethacrylate (manufactured by Uni-Chemical Co., Ltd.)

DMEA: Dimethyl ethanolamine

Note that, mass average molecular weights of Copolymers A1 to A45 described in Tables A1-1 and A1-2 were measured as follows.

The mass average molecular weights were measured by GPC method by means of a thermostat bath for column (CTO-20A, manufactured by Shimadzu Corporation), a detector (RID-10A, manufactured by Shimadzu Corporation), a pump for eluent flow channel (LC-20AD, manufactured by Shimadzu Corporation), a degasser (DGU-20A, manufactured by Shimadzu Corporation), and an autosampler (SIL-20A, manufactured by Shimadzu Corporation). As for the column, the following were connected with each other: Aqueous SEC column TSKgelG3000PWXL (exclusion limit molecular weight: $2 \times 10^5$); TSKgelG5000PWXL (exclusion limit molecular weight: $2.5 \times 10^9$; and TSKgelG6000PWXL (exclusion limit molecular weight: 5×10$^7$) (all manufactured by Tosoh Corporation). A measurement sample was adjusted to a concentration of 2 g/100 mL with the use of an eluent. As for the eluent, an aqueous solution containing 0.5 mol/L of acetic acid and 0.5 mol/L of sodium acetate was used. A temperature of the column was 40° C., and the flow rate was 1.0 mL/min. A calibration curve was generated using, as standard samples, 9 polyethylene glycols having molecular weights of 1,065, 5,050, 24,000, 50,000, 107,000, 140,000, 250,000, 540,000, and 920,000. Based on the calibration curve, the mass average molecular weights were calculated.

Synthetic Example A1

A 1 L four-necked flask equipped with a reflux condenser, a thermometer, a pipe for nitrogen purge, and a stirrer was charged with 15 parts of PHOSMER M, 35 parts of DAAM, 50 parts of StA, and 500 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A1.

Synthetic Example A2

A 1 L five-necked flask equipped with a reflux condenser, a thermometer, a pipe for nitrogen purge, a dropping funnel, and a stirrer was charged with 200 parts of ethanol. Additionally, the dropping funnel was charged with a mixed solution produced by dissolving 5 parts of PHOSMER M, 35 parts of DAAM, and 60 parts of StA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A2.

Synthetic Example A3

A four-necked flask being the same as described in Synthetic Example A1 was charged with 30 parts of PHOSMER M, 10 parts of DAAM, 60 parts of StA and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A3.

Synthetic Example A4

A four-necked flask being the same as described in Synthetic Example A1 was charged with 55 parts of PHOSMER M, 35 parts of DAAM, 10 parts of StA and 500 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A4.

Synthetic Example A5

A five-necked flask being the same as described in Synthetic Example A2 was charged with 200 parts of ethanol. Additionally, the dropping funnel was charged with a mixed solution produced by dissolving 65 parts of PHOSMER M, 20 parts of DAAM, and 15 parts of StA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A5.

Synthetic Example A6

A five-necked flask being the same as described in Synthetic Example A2 was charged with 200 parts of ethanol. Additionally, the dropping funnel was charged with a mixed solution produced by dissolving 30 parts of PHOSMER M, 5 parts of DAAM, and 65 parts of StA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A6.

Synthetic Example A7

A four-necked flask being the same as described in Synthetic Example A1 was charged with 55 parts of PHOSMER M, 35 parts of DAAM, 10 parts of StA and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A7.

Synthetic Example A8

A four-necked flask being the same as described in Synthetic Example A1 was charged with 65 parts of PHOSMER M, 20 parts of DAAM, 15 parts of StA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A8.

Synthetic Example A9

A four-necked flask being the same as described in Synthetic Example A1 was charged with 55 parts of PHOSMER M, 35 parts of DAAM, 10 parts of StA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A9.

Synthetic Example A10

A four-necked flask being the same as described in Synthetic Example A1 was charged with 15 parts of PHOSMER M, 35 parts of DAAM, 50 parts of StA and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A10.

Synthetic Example A11

A four-necked flask being the same as described in Synthetic Example A1 was charged with 5 parts of PHOSMER M, 35 parts of DAAM, 60 parts of StA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A11.

Synthetic Example A12

A four-necked flask being the same as described in Synthetic Example A1 was charged with 15 parts of PHOSMER M, 35 parts of DAAM, 50 parts of StA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A12.

Synthetic Example A13

A five-necked flask being the same as described in Synthetic Example A2 was charged with 200 parts of ethanol. Additionally, the dropping funnel was charged with a mixed solution produced by dissolving 15 parts of PHOSMER M, 35 parts of DAAM, and 50 parts of StA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with sodium hydroxide in a molar amount equivalent to an acid monomer so as to give the neutralization rate of 100%, to thereby obtain Copolymer A13.

Synthetic Example A14

A five-necked flask being the same as described in Synthetic Example A2 was charged with 200 parts of ethanol. Additionally, the dropping funnel was charged with a mixed solution produced by dissolving 15 parts of PHOSMER M, 35 parts of DAAM, and 50 parts of StA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with lithium hydroxide in a molar amount equivalent to an acid monomer so as to give the neutralization rate of 100%, to thereby obtain Copolymer A14.

Synthetic Example A15

A four-necked flask being the same as described in Synthetic Example A1 was charged with 5 parts of PHOSMER M, 35 parts of DAAM, 60 parts of StA and 500 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A15.

Synthetic Example A16

A four-necked flask being the same as described in Synthetic Example A1 was charged with 65 parts of PHOSMER M, 20 parts of DAAM, 15 parts of StA and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A16.

Synthetic Example A17

A five-necked flask being the same as described in Synthetic Example A2 was charged with 200 parts of ethanol. Additionally, the dropping funnel was charged with a mixed solution produced by dissolving 15 parts of P-1A, 35 parts of DAAM, and 50 parts of StA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A17.

Synthetic Example A18

A five-necked flask being the same as described in Synthetic Example A2 was charged with 200 parts of ethanol. Additionally, the dropping funnel was charged with a mixed solution produced by dissolving 15 parts of PHOSMER M, 35 parts of DAAM, and 50 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A18.

Synthetic Example A19

A five-necked flask being the same as described in Synthetic Example A2 was charged with 200 parts of ethanol. Additionally, the dropping funnel was charged with a mixed solution produced by dissolving 5 parts of PHOSMER M, 35 parts of DAAM, and 60 parts of BzA into 50 parts of ethanol and uniformly mixing together. The flask was heated under a nitrogen stream, and 0.2 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A19.

Synthetic Example A20

A five-necked flask being the same as described in Synthetic Example A2 was charged with 200 parts of ethanol. Additionally, the dropping funnel was charged with a mixed solution produced by dissolving 15 parts of PHOSMER M, 35 parts of DAAM, and 50 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A20.

Synthetic Example A21

A five-necked flask being the same as described in Synthetic Example A2 was charged with 200 parts of ethanol. Additionally, the dropping funnel was charged with a mixed solution produced by dissolving 55 parts of PHOSMER M, 35 parts of DAAM, and 10 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A21.

Synthetic Example A22

A five-necked flask being the same as described in Synthetic Example A2 was charged with 200 parts of ethanol. Additionally, the dropping funnel was charged with a mixed solution produced by dissolving 65 parts of PHOSMER M, 20 parts of DAAM, and 15 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A22.

Synthetic Example A23

A five-necked flask being the same as described in Synthetic Example A2 was charged with 200 parts of ethanol. Additionally, the dropping funnel was charged with a mixed solution produced by dissolving 55 parts of PHOSMER M, 35 parts of DAAM, and 10 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A23.

Synthetic Example A24

A four-necked flask being the same as described in Synthetic Example A1 was charged with 55 parts of PHOSMER M, 35 parts of DAAM, 10 parts of BzA and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A24.

Synthetic Example A25

A four-necked flask being the same as described in Synthetic Example A1 was charged with 65 parts of PHOSMER M, 20 parts of DAAM, 15 parts of BzA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A25.

Synthetic Example A26

A four-necked flask being the same as described in Synthetic Example A1 was charged with 55 parts of PHOSMER M, 35 parts of DAAM, 10 parts of BzA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A26.

Synthetic Example A27

A four-necked flask being the same as described in Synthetic Example A1 was charged with 15 parts of PHOSMER M, 35 parts of DAAM, 50 parts of BzA and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A27.

Synthetic Example A28

A four-necked flask being the same as described in Synthetic Example A1 was charged with 5 parts of PHOSMER M, 35 parts of DAAM, 60 parts of BzA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A28.

Synthetic Example A29

A four-necked flask being the same as described in Synthetic Example A1 was charged with 15 parts of PHOSMER M, 35 parts of DAAM, 50 parts of BzA and 200 parts of ethanol. The flask was heated under a nitrogen stream, and 1.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A29.

Synthetic Example A30

A five-necked flask being the same as described in Synthetic Example A2 was charged with 200 parts of ethanol. Additionally, the dropping funnel was charged with a mixed solution produced by dissolving 15 parts of PHOSMER M, 35 parts of DAAM, and 50 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with sodium hydroxide in a molar amount equivalent to an acid monomer so as to give the neutralization rate of 100%, to thereby obtain Copolymer A30.

Synthetic Example A31

A five-necked flask being the same as described in Synthetic Example A2 was charged with 200 parts of ethanol. Additionally, the dropping funnel was charged with a mixed solution produced by dissolving 15 parts of PHOSMER M, 35 parts of DAAM, and 50 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with lithium hydroxide in a molar amount equivalent to an acid monomer so as to give the neutralization rate of 100%, to thereby obtain Copolymer A31.

Synthetic Example A32

A five-necked flask being the same as described in Synthetic Example A2 was charged with 200 parts of ethanol. Additionally, the dropping funnel was charged with a mixed solution produced by dissolving 5 parts of PHOSMER M, 35 parts of DAAM, and 60 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A32.

Synthetic Example A33

A four-necked flask being the same as described in Synthetic Example A1 was charged with 65 parts of PHOSMER M, 20 parts of DAAM, 15 parts of BzA and 200 parts of ethanol. The flask was heated under a nitrogen stream, and 1 part of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A33.

Synthetic Example A34

A four-necked flask being the same as described in Synthetic Example A1 was charged with 30 parts of P-1A, 10 parts of DAAM, 60 parts of BzA and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A34.

Synthetic Example A35

A four-necked flask being the same as described in Synthetic Example A1 was charged with 30 parts of PHOSMER PE, 10 parts of DAAM, 60 parts of BzA and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A35.

Synthetic Example A36

A four-necked flask being the same as described in Synthetic Example A1 was charged with 30 parts of PHOSMER PP, 10 parts of DAAM, 60 parts of BzA and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A36.

Synthetic Example A37

A four-necked flask being the same as described in Synthetic Example A1 was charged with 30 parts of (Formula 5-5), 10 parts of DAAM, 60 parts of BzA and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A37.

Synthetic Example A38

A four-necked flask being the same as described in Synthetic Example A1 was charged with 30 parts of PHOSMER M, 10 parts of DAAM, 60 parts of BzA and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give 50% of the neutralization rate, to thereby obtain Copolymer A38.

Synthetic Example A39

A five-necked flask being the same as described in Synthetic Example A2 was charged with 200 parts of ethanol. Additionally, the dropping funnel was charged with a mixed solution produced by dissolving 15 parts of PHOSMER M, 35 parts of DAAM, and 50 parts of BzA into 50 parts of ethanol and uniformly mixing together. The flask was heated under a nitrogen stream, and 0.5 parts of a radical polymerization initiator was added thereto at 70° C. Then, the mixed solution which had been charged in the dropping funnel was added dropwise to the flask for 2 hours, followed by allowing to react together for 6 hours while keeping a temperature at 70° C. After termination of the reaction, the resultant reaction product was neutralized with dimethyl ethanolamine in a molar amount equivalent to an acid monomer so as to give the neutralization rate of 100%, to thereby obtain Copolymer A39.

Synthetic Example A40

A four-necked flask being the same as described in Synthetic Example A1 was charged with 15 parts of styrene, 85 parts of DAAM, and 100 parts of ethanol. The flask was heated under a nitrogen stream, and 0.5 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A40.

Synthetic Example A41

A five-necked flask being the same as described in Synthetic Example A2 was charged with 200 parts of ethanol. Additionally, the dropping funnel was charged with a mixed solution produced by dissolving 15 parts of PHOSMER M, 85 parts of methacrylic acid into 50 parts of ethanol and uniformly mixing together. The flask was heated under a nitrogen stream, and 0.5 parts of a radical polymerization initiator was added thereto at 70° C. The mixed solution which had been charged in the dropping funnel was added dropwise to the flask for 2 hours, followed by allowing to react together for 6 hours while keeping a temperature at 70° C. After termination of the reaction, the resultant reaction product was neutralized with potassium hydroxide in a molar amount equivalent to an acid monomer so as to give the neutralization rate of 100%, to thereby obtain Copolymer A41.

Synthetic Example A42

A four-necked flask being the same as described in Synthetic Example A1 was charged with 15 parts of styrene, 85 parts of methacrylic acid, and 100 parts of ethanol. The flask was heated under a nitrogen stream, and 0.2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A42.

Synthetic Example A43

A four-necked flask being the same as described in Synthetic Example A1 was charged with 30 parts of PHOSMER M, 10 parts of DAMAM, 60 parts of StA, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A43.

Synthetic Example A44

A four-necked flask being the same as described in Synthetic Example A1 was charged with 30 parts of PHOSMER M, 10 parts of DAAM, 60 parts of StA, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A44.

Synthetic Example A45

A four-necked flask being the same as described in Synthetic Example A1 was charged with 30 parts of PHOSMER M, 10 parts of DAAM, 60 parts of BzMA, and 200 parts of ethanol. The flask was heated under a nitrogen stream, and 2 parts of a radical polymerization initiator was added thereto at 70° C., followed by allowing to react together for 6 hours while keeping a temperature at 70° C. After termination of the reaction, the resultant reaction product was neutralized with potassium hydroxide so as to give the neutralization rate of 100%, to thereby obtain Copolymer A45.

TABLE A1-1

| | | Monomer | | | |
| --- | --- | --- | --- | --- | --- |
| | | (F 5) | (F 6) | (F 7) | (F 8) |
| Syn. Ex. A1 | Copolymer A1 | PHOSMER M | DAAM | StA | — |
| Syn. Ex. A2 | Copolymer A2 | PHOSMER M | DAAM | StA | — |
| Syn. Ex. A3 | Copolymer A3 | PHOSMER M | DAAM | StA | — |
| Syn. Ex. A4 | Copolymer A4 | PHOSMER M | DAAM | StA | — |
| Syn. Ex. A5 | Copolymer A5 | PHOSMER M | DAAM | StA | — |
| Syn. Ex. A6 | Copolymer A6 | PHOSMER M | DAAM | StA | — |
| Syn. Ex. A7 | Copolymer A7 | PHOSMER M | DAAM | StA | — |
| Syn. Ex. A8 | Copolymer A8 | PHOSMER M | DAAM | StA | — |
| Syn. Ex. A9 | Copolymer A9 | PHOSMER M | DAAM | StA | — |
| Syn. Ex. A10 | Copolymer A10 | PHOSMER M | DAAM | StA | — |
| Syn. Ex. A11 | Copolymer A11 | PHOSMER M | DAAM | StA | — |
| Syn. Ex. A12 | Copolymer A12 | PHOSMER M | DAAM | StA | — |
| Syn. Ex. A13 | Copolymer A13 | PHOSMER M | DAAM | StA | — |
| Syn. Ex. A14 | Copolymer A14 | PHOSMER M | DAAM | StA | — |
| Syn. Ex. A15 | Copolymer A15 | PHOSMER M | DAAM | StA | — |
| Syn. Ex. A16 | Copolymer A16 | PHOSMER M | DAAM | StA | — |
| Syn. Ex. A17 | Copolymer A17 | P-1A | DAAM | StA | — |
| Syn. Ex. A18 | Copolymer A18 | PHOSMER M | DAAM | — | BzA |
| Syn. Ex. A19 | Copolymer A19 | PHOSMER M | DAAM | — | BzA |
| Syn. Ex. A20 | Copolymer A20 | PHOSMER M | DAAM | — | BzA |
| Syn. Ex. A21 | Copolymer A21 | PHOSMER M | DAAM | — | BzA |
| Syn. Ex. A22 | Copolymer A22 | PHOSMER M | DAAM | — | BzA |
| Syn. Ex. A23 | Copolymer A23 | PHOSMER M | DAAM | — | BzA |
| Syn. Ex. A24 | Copolymer A24 | PHOSMER M | DAAM | — | BzA |
| Syn. Ex. A25 | Copolymer A25 | PHOSMER M | DAAM | — | BzA |
| Syn. Ex. A26 | Copolymer A26 | PHOSMER M | DAAM | — | BzA |
| Syn. Ex. A27 | Copolymer A27 | PHOSMER M | DAAM | — | BzA |
| Syn. Ex. A28 | Copolymer A28 | PHOSMER M | DAAM | — | BzA |
| Syn. Ex. A29 | Copolymer A29 | PHOSMER M | DAAM | — | BzA |
| Syn. Ex. A30 | Copolymer A30 | PHOSMER M | DAAM | — | BzA |
| Syn. Ex. A31 | Copolymer A31 | PHOSMER M | DAAM | — | BzA |
| Syn. Ex. A32 | Copolymer A32 | PHOSMER M | DAAM | — | BzA |
| Syn. Ex. A33 | Copolymer A33 | PHOSMER M | DAAM | — | BzA |
| Syn. Ex. A34 | Copolymer A34 | P-1A | DAAM | — | BzA |
| Syn. Ex. A35 | Copolymer A35 | PHOSMER PE | DAAM | — | BzA |
| Syn. Ex. A36 | Copolymer A36 | PHOSMER PP | DAAM | — | BzA |

TABLE A1-1-continued

|  |  | Monomer | | | |
|---|---|---|---|---|---|
|  |  | (F 5) | (F 6) | (F 7) | (F 8) |
| Syn. Ex. A37 | Copolymer A37 | (Formula 5-5) | DAAM | — | BzA |
| Syn. Ex. A38 | Copolymer A38 | PHOSMER M | DAAM | — | BzA |
| Syn. Ex. A39 | Copolymer A39 | PHOSMER M | DAAM | — | BzA |
| Syn. Ex. A40 | Copolymer A40 | Styrene | DAAM | — | — |
| Syn. Ex. A41 | Copolymer A41 | PHOSMER M | Methacrylic acid | — | — |
| Syn. Ex. A42 | Copolymer A42 | Styrene | Methacrylic acid | — | — |
| Syn. Ex. A43 | Copolymer A43 | PHOSMER M | DAMAM | StA | — |
| Syn. Ex. A44 | Copolymer A44 | PHOSMER M | DAAM | StMA | — |
| Syn. Ex. A45 | Copolymer A45 | PHOSMER M | DAAM | — | BzMA |

TABLE A1-2

|  | Content | | | | Mass average molecular weight | Counter ion | Neutralization rate (%) |
|---|---|---|---|---|---|---|---|
|  | (F 5) | (F 6) | (F 7) | (F 8) |  |  |  |
| Syn. Ex. A1 | 15 | 35 | 50 | — | 3,000 | K | 100 |
| Syn. Ex. A2 | 5 | 35 | 60 | — | 7,000 | K | 100 |
| Syn. Ex. A3 | 30 | 10 | 60 | — | 30,000 | K | 100 |
| Syn. Ex. A4 | 55 | 35 | 10 | — | 3,000 | K | 100 |
| Syn. Ex. A5 | 65 | 20 | 15 | — | 7,000 | K | 100 |
| Syn. Ex. A6 | 30 | 5 | 65 | — | 7,000 | K | 100 |
| Syn. Ex. A7 | 55 | 35 | 10 | — | 60,000 | K | 100 |
| Syn. Ex. A8 | 65 | 20 | 15 | — | 45,000 | K | 100 |
| Syn. Ex. A9 | 55 | 35 | 10 | — | 45,000 | K | 100 |
| Syn. Ex. A10 | 15 | 35 | 50 | — | 60,000 | K | 100 |
| Syn. Ex. A11 | 5 | 35 | 60 | — | 45,000 | K | 100 |
| Syn. Ex. A12 | 15 | 35 | 50 | — | 45,000 | K | 100 |
| Syn. Ex. A13 | 15 | 35 | 50 | — | 7,000 | Na | 100 |
| Syn. Ex. A14 | 15 | 35 | 50 | — | 7,000 | Li | 100 |
| Syn. Ex. A15 | 5 | 35 | 60 | — | 3,000 | K | 100 |
| Syn. Ex. A16 | 65 | 20 | 15 | — | 60,000 | K | 100 |
| Syn. Ex. A17 | 15 | 35 | 50 | — | 7,000 | K | 100 |
| Syn. Ex. A18 | 15 | 35 | — | 50 | 3,000 | K | 100 |
| Syn. Ex. A19 | 5 | 35 | — | 60 | 7,000 | K | 100 |
| Syn. Ex. A20 | 15 | 35 | — | 50 | 7,000 | K | 100 |
| Syn. Ex. A21 | 55 | 35 | — | 10 | 3,000 | K | 100 |
| Syn. Ex. A22 | 65 | 20 | — | 15 | 7,000 | K | 100 |
| Syn. Ex. A23 | 55 | 35 | — | 10 | 7,000 | K | 100 |
| Syn. Ex. A24 | 55 | 35 | — | 10 | 60,000 | K | 100 |
| Syn. Ex. A25 | 65 | 20 | — | 15 | 45,000 | K | 100 |
| Syn. Ex. A26 | 55 | 35 | — | 10 | 45,000 | K | 100 |
| Syn. Ex. A27 | 15 | 35 | — | 50 | 60,000 | K | 100 |
| Syn. Ex. A28 | 5 | 35 | — | 60 | 45,000 | K | 100 |
| Syn. Ex. A29 | 15 | 35 | — | 50 | 45,000 | K | 100 |
| Syn. Ex. A30 | 15 | 35 | — | 50 | 7,000 | Na | 100 |
| Syn. Ex. A31 | 15 | 35 | — | 50 | 7,000 | Li | 100 |
| Syn. Ex. A32 | 5 | 35 | — | 60 | 3,000 | K | 100 |
| Syn. Ex. A33 | 65 | 20 | — | 15 | 60,000 | K | 100 |
| Syn. Ex. A34 | 30 | 10 | — | 60 | 30,000 | K | 100 |
| Syn. Ex. A35 | 30 | 10 | — | 60 | 30,000 | K | 100 |
| Syn. Ex. A36 | 30 | 10 | — | 60 | 30,000 | K | 100 |
| Syn. Ex. A37 | 30 | 10 | — | 60 | 30,000 | K | 100 |
| Syn. Ex. A38 | 30 | 10 | — | 60 | 30,000 | K/H | 50 |
| Syn. Ex. A39 | 15 | 35 | — | 50 | 7,000 | DMEA | 100 |
| Syn. Ex. A40 | (15) | 85 | — | — | 7,000 | K | 100 |
| Syn. Ex. A41 | 15 | (85) | — | — | 7,000 | K | 100 |

TABLE A1-2-continued

|  | Content | | | | Mass average molecular weight | Counter ion | Neutralization rate (%) |
|---|---|---|---|---|---|---|---|
|  | (F 5) | (F 6) | (F 7) | (F 8) |  |  |  |
| Syn. Ex. A42 | (15) | (85) | — | — | 10,000 | K | 100 |
| Syn. Ex. A43 | 30 | 10 | 60 | — | 30,000 | K | 100 |
| Syn. Ex. A44 | 30 | 10 | 60 | — | 30,000 | K | 100 |
| Syn. Ex. A45 | 30 | 10 | — | 60 | 30,000 | K | 100 |

In Tables A1-1 and A1-2, (F 5) to (F 8) denote monomers represented by the General Formulae (5) to (8), respectively.

<Preparation of Pigment dispersions A1 to A55>

Firstly, each of Copolymers, a pigment, and pure water were pre-mixed together using materials described in each of columns of Pigment dispersions A1 to A55 in Tables A2-1 to A4-2, to thereby produce mixed slurry. Then, the mixed slurry was subjected to circulation dispersion with a disc-type media mill (MODEL DMR, manufactured by Ashizawa Finetech Ltd.) and 0.05 mm zirconia beads (packing rate: 55%) at a circumferential speed of 10 m/s and a liquid temperature of 10° C. for 3 min, followed by centrifugation with a centrifuge (MODEL-7700, manufactured by KUBOTA CORPORATION) to remove coarse particles, to thereby obtain Pigment dispersion. Numerical values described in Tables A2-1 to A4-2 denote blending ratios (parts by weight).

Note that, each of Copolymers A1 to A45 was dried to remove a solvent therein, and then, the resultant solid matter was dissolved into water so as to give a 20% aqueous solution, which was used as Copolymer. Materials other than Copolymers will be described in detail.

Carbon black (NIPEX160, manufactured by Degussa AG, BET specific surface area: 150 m²/g, average primary particle diameter: 20 nm, pH 4.0, DBP oil absorption amount: 620 g/100 g)

Pigment Blue 15:3 (CHROMOFINE BLUE-A-220JC, manufactured by Dainichiseika Color & Chemicals Mfg. Co., Ltd.)

Pigment Red 122 (TONER MAGENTA E002, manufactured by Clariant International Ltd.)

Pigment Yellow 74 (FAST YELLOW 531, manufactured by Dainichiseika Color & Chemicals Mfg. Co., Ltd.)

TABLE A2-1

| | Pigment dispersion | | | | | | | | | |
|---|---|---|---|---|---|---|---|---|---|---|
| | A1 | A2 | A3 | A4 | A5 | A6 | A7 | A8 | A9 | A10 |
| Copolymer A1 | | | | | | | 20 | | | |
| Copolymer A2 | | | | | | | | 20 | | |
| Copolymer A3 | 10 | 20 | 80 | 20 | 20 | 20 | | | | |
| Copolymer A4 | | | | | | | | | 20 | |
| Copolymer A5 | | | | | | | | | | 20 |
| Copolymer A6 | | | | | | | | | | |
| Copolymer A7 | | | | | | | | | | |
| Copolymer A8 | | | | | | | | | | |
| Copolymer A9 | | | | | | | | | | |
| Copolymer A10 | | | | | | | | | | |
| Copolymer A11 | | | | | | | | | | |
| Copolymer A12 | | | | | | | | | | |
| Carbon black | 16 | 16 | 16 | | | | 16 | 16 | 16 | 16 |
| Pigment Blue 15:3 | | | | 16 | | | | | | |
| Pigment Red 122 | | | | | 16 | | | | | |
| Pigment Yellow 74 | | | | | | 16 | | | | |
| Pure water | Bal. | Bal. | Bal. | Bal. | Bal. | Bal. | Bal. | Bal. | Bal. | Bal. |
| Total | 100 | 100 | 100 | 100 | 100 | 100 | 100 | 100 | 100 | 100 |

TABLE A2-2

| | Pigment dispersion | | | | | | |
|---|---|---|---|---|---|---|---|
| | A11 | A12 | A13 | A14 | A15 | A16 | A17 |
| Copolymer A1 | | | | | | | |
| Copolymer A2 | | | | | | | |
| Copolymer A3 | | | | | | | |
| Copolymer A4 | | | | | | | |
| Copolymer A5 | | | | | | | |
| Copolymer A6 | 20 | | | | | | |
| Copolymer A7 | | 20 | | | | | |
| Copolymer A8 | | | 20 | | | | |
| Copolymer A9 | | | | 20 | | | |
| Copolymer A10 | | | | | 20 | | |
| Copolymer A11 | | | | | | 20 | |
| Copolymer A12 | | | | | | | 20 |
| Carbon black | 16 | 16 | 16 | 16 | 16 | 16 | 16 |
| Pigment Blue 15:3 | | | | | | | |
| Pigment Red 122 | | | | | | | |
| Pigment Yellow 74 | | | | | | | |
| Pure water | Bal. | Bal. | Bal. | Bal. | Bal. | Bal. | Bal. |
| Total | 100 | 100 | 100 | 100 | 100 | 100 | 100 |

TABLE A3-1

| | Pigment dispersion | | | | | | | | | |
|---|---|---|---|---|---|---|---|---|---|---|
| | A18 | A19 | A20 | A21 | A22 | A23 | A24 | A25 | A26 | A27 |
| Copolymer A13 | 20 | | | | | | | | | |
| Copolymer A14 | | 20 | | | | | | | | |
| Copolymer A15 | | | 20 | | | | | | | |
| Copolymer A16 | | | | 20 | | | | | | |
| Copolymer A17 | | | | | 20 | | | | | |
| Copolymer A18 | | | | | | | | | | |
| Copolymer A19 | | | | | | | | | | |
| Copolymer A20 | | | | | | 10 | 20 | 80 | 20 | 20 |
| Copolymer A21 | | | | | | | | | | |
| Copolymer A22 | | | | | | | | | | |
| Copolymer A23 | | | | | | | | | | |
| Copolymer A24 | | | | | | | | | | |
| Carbon black | 16 | 16 | 16 | 16 | 16 | 16 | 16 | 16 | 16 | |
| Pigment Blue 15:3 | | | | | | | | | | 16 |
| Pigment Red 122 | | | | | | | | | | |
| Pigment Yellow 74 | | | | | | | | | | |
| Pure water | Bal. | Bal. | Bal. | Bal. | Bal. | Bal. | Bal. | Bal. | Bal. | Bal. |
| Total | 100 | 100 | 100 | 100 | 100 | 100 | 100 | 100 | 100 | 100 |

TABLE A3-2

| | Pigment dispersion | | | | | | |
|---|---|---|---|---|---|---|---|
| | A28 | A29 | A30 | A31 | A32 | A33 | A34 |
| Copolymer A13 | | | | | | | |
| Copolymer A14 | | | | | | | |
| Copolymer A15 | | | | | | | |
| Copolymer A16 | | | | | | | |
| Copolymer A17 | | | | | | | |
| Copolymer A18 | | 20 | | | | | |
| Copolymer A19 | | | 20 | | | | |
| Copolymer A20 | 20 | | | | | | |
| Copolymer A21 | | | | 20 | | | |
| Copolymer A22 | | | | | 20 | | |
| Copolymer A23 | | | | | | 20 | |
| Copolymer A24 | | | | | | | 20 |
| Carbon black | | | 16 | 16 | 16 | 16 | 16 |
| Pigment Blue 15:3 | | | | | | | |
| Pigment Red 122 | 16 | | | | | | |
| Pigment Yellow 74 | | 16 | | | | | |
| Pure water | Bal. | Bal. | Bal. | Bal. | Bal. | Bal. | Bal. |
| Total | 100 | 100 | 100 | 100 | 100 | 100 | 100 |

TABLE A4-1

| | Pigment dispersion | | | | | | | | | | |
|---|---|---|---|---|---|---|---|---|---|---|---|
| | A35 | A36 | A37 | A38 | A39 | A40 | A41 | A42 | A43 | A44 | A45 |
| Copolymer A25 | 20 | | | | | | | | | | |
| Copolymer A26 | | 20 | | | | | | | | | |
| Copolymer A27 | | | 20 | | | | | | | | |
| Copolymer A28 | | | | 20 | | | | | | | |
| Copolymer A29 | | | | | 20 | | | | | | |
| Copolymer A30 | | | | | | 20 | | | | | |
| Copolymer A31 | | | | | | | 20 | | | | |
| Copolymer A32 | | | | | | | | 20 | | | |
| Copolymer A33 | | | | | | | | | 20 | | |
| Copolymer A34 | | | | | | | | | | 20 | |
| Copolymer A35 | | | | | | | | | | | 20 |
| Copolymer A36 | | | | | | | | | | | |
| Copolymer A37 | | | | | | | | | | | |
| Copolymer A38 | | | | | | | | | | | |
| Copolymer A39 | | | | | | | | | | | |
| Copolymer A40 | | | | | | | | | | | |
| Copolymer A41 | | | | | | | | | | | |
| Copolymer A42 | | | | | | | | | | | |
| Copolymer A43 | | | | | | | | | | | |
| Copolymer A44 | | | | | | | | | | | |
| Copolymer A45 | | | | | | | | | | | |

TABLE A4-1-continued

|  | Pigment dispersion | | | | | | | | | | |
|---|---|---|---|---|---|---|---|---|---|---|---|
|  | A35 | A36 | A37 | A38 | A39 | A40 | A41 | A42 | A43 | A44 | A45 |
| Carbon black | 16 | 16 | 16 | 16 | 16 | 16 | 16 | 16 | 16 | 16 | 16 |
| Pigment Blue 15:3 | | | | | | | | | | | |
| Pigment Red 122 | | | | | | | | | | | |
| Pigment Yellow 74 | | | | | | | | | | | |
| Pure water | Bal. | Bal. | Bal. | Bal. | Bal. | Bal. | Bal. | Bal. | Bal. | Bal. | Bal. |
| Total | 100 | 100 | 100 | 100 | 100 | 100 | 100 | 100 | 100 | 100 | 100 |

TABLE A4-2

|  | Pigment dispersion | | | | | | | | | |
|---|---|---|---|---|---|---|---|---|---|---|
|  | A46 | A47 | A48 | A49 | A50 | A51 | A52 | A53 | A54 | A55 |
| Copolymer A25 | | | | | | | | | | |
| Copolymer A26 | | | | | | | | | | |
| Copolymer A27 | | | | | | | | | | |
| Copolymer A28 | | | | | | | | | | |
| Copolymer A29 | | | | | | | | | | |
| Copolymer A30 | | | | | | | | | | |
| Copolymer A31 | | | | | | | | | | |
| Copolymer A32 | | | | | | | | | | |
| Copolymer A33 | | | | | | | | | | |
| Copolymer A34 | | | | | | | | | | |
| Copolymer A35 | | | | | | | | | | |
| Copolymer A36 | 20 | | | | | | | | | |
| Copolymer A37 | | 20 | | | | | | | | |
| Copolymer A38 | | | 20 | | | | | | | |
| Copolymer A39 | | | | 20 | | | | | | |
| Copolymer A40 | | | | | 20 | | | | | |
| Copolymer A41 | | | | | | 20 | | | | |
| Copolymer A42 | | | | | | | 20 | | | |
| Copolymer A43 | | | | | | | | 20 | | |
| Copolymer A44 | | | | | | | | | 20 | |
| Copolymer A45 | | | | | | | | | | 20 |
| Carbon black | 16 | 16 | 16 | 16 | 16 | 16 | 16 | 16 | 16 | 16 |
| Pigment Blue 15:3 | | | | | | | | | | |
| Pigment Red 122 | | | | | | | | | | |
| Pigment Yellow 74 | | | | | | | | | | |
| Pure water | Bal. | Bal. | Bal. | Bal. | Bal. | Bal. | Bal. | Bal. | Bal. | Bal. |
| Total | 100 | 100 | 100 | 100 | 100 | 100 | 100 | 100 | 100 | 100 |

Examples A1 to A56 and Comparative Examples A1 to A3

<Production of Ink>

Materials described in each of columns of Examples A1 to A56 and Comparative Examples A1 to A3 in Tables A5-1 to A6-4 were mixed and stirred for 1 hour to thereby produce a uniform dispersion. The resultant dispersion was subjected to pressure filtration with a polyvinylidene fluoride membrane filter having an average pore diameter of 5.0 μm to remove coarse particles and contaminants, to thereby obtain an ink.

Note that, numerical values in Tables denote % by mass.

TABLE A5-1

|  |  | Example | | | | | | | | | |
|---|---|---|---|---|---|---|---|---|---|---|---|
|  | Material name | A1 | A2 | A3 | A4 | A5 | A6 | A7 | A8 | A9 | A10 |
| Pigment dispersion | Pigment dispersion A1 | 50 | | | | | | | | | |
|  | Pigment dispersion A2 | | 50 | 50 | 50 | | | | | | |
|  | Pigment dispersion A3 | | | | | | 50 | | | | |
|  | Pigment dispersion A4 | | | | | | | | 30 | | |
|  | Pigment dispersion A5 | | | | | | | | | 50 | |

TABLE A5-1-continued

|  | Material name | A1 | A2 | A3 | A4 | A5 | A6 | A7 | A8 | A9 | A10 |
|---|---|---|---|---|---|---|---|---|---|---|---|
|  | Pigment dispersion A6 |  |  |  |  |  |  |  | 30 |  |  |
|  | Pigment dispersion A7 |  |  |  |  |  |  |  |  | 50 |  |
|  | Pigment dispersion A8 |  |  |  |  |  |  |  |  |  | 50 |
|  | Pigment dispersion A9 |  |  |  |  |  |  |  |  |  |  |
|  | Pigment dispersion A10 |  |  |  |  |  |  |  |  |  |  |
|  | Pigment dispersion A11 |  |  |  |  |  |  |  |  |  |  |
|  | Pigment dispersion A12 |  |  |  |  |  |  |  |  |  |  |
|  | Pigment dispersion A13 |  |  |  |  |  |  |  |  |  |  |
|  | Pigment dispersion A14 |  |  |  |  |  |  |  |  |  |  |
|  | Pigment dispersion A15 |  |  |  |  |  |  |  |  |  |  |
|  | Pigment dispersion A16 |  |  |  |  |  |  |  |  |  |  |
|  | Pigment dispersion A17 |  |  |  |  |  |  |  |  |  |  |
|  | Pigment dispersion A18 |  |  |  |  |  |  |  |  |  |  |
|  | Pigment dispersion A19 |  |  |  |  |  |  |  |  |  |  |
|  | Pigment dispersion A20 |  |  |  |  |  |  |  |  |  |  |
|  | Pigment dispersion A21 |  |  |  |  |  |  |  |  |  |  |
|  | Pigment dispersion A22 |  |  |  |  |  |  |  |  |  |  |
|  | Pigment dispersion A23 |  |  |  |  |  |  |  |  |  |  |
|  | Pigment dispersion A24 |  |  |  |  |  |  |  |  |  |  |
| Water-soluble | Glycerin | 10 | 10 |  | 20 | 10 | 10 | 10 | 10 | 10 | 10 |
| Organic solvent | 1,3-Butanediol | 20 | 20 | 30 |  | 20 | 20 | 20 | 20 | 20 | 20 |
|  | Trimethylol propane |  |  |  | 5 |  |  |  |  |  |  |
|  | 2-Pyrroridone |  |  |  | 5 |  |  |  |  |  |  |
| Distilled water |  | Bal. | Bal. | Bal. | Bal. | Bal. | Bal. | Bal. | Bal. | Bal. | Bal. |
| Total |  | 100 | 100 | 100 | 100 | 100 | 100 | 100 | 100 | 100 | 100 |

TABLE A5-2

|  | Material name | A11 | A12 | A13 | A14 | A15 | A16 | A17 | A18 | A19 | A20 |
|---|---|---|---|---|---|---|---|---|---|---|---|
| Pigment dispersion | Pigment dispersion A1 |  |  |  |  |  |  |  |  |  |  |
|  | Pigment dispersion A2 |  |  |  |  |  |  |  |  |  |  |
|  | Pigment dispersion A3 |  |  |  |  |  |  |  |  |  |  |
|  | Pigment dispersion A4 |  |  |  |  |  |  |  |  |  |  |
|  | Pigment dispersion A5 |  |  |  |  |  |  |  |  |  |  |
|  | Pigment dispersion A6 |  |  |  |  |  |  |  |  |  |  |
|  | Pigment dispersion A7 |  |  |  |  |  |  |  |  |  |  |
|  | Pigment dispersion A8 |  |  |  |  |  |  |  |  |  |  |
|  | Pigment dispersion A9 | 50 |  |  |  |  |  |  |  |  |  |
|  | Pigment dispersion A10 |  | 50 |  |  |  |  |  |  |  |  |

TABLE A5-2-continued

| | Material name | Example | | | | | | | | | |
|---|---|---|---|---|---|---|---|---|---|---|---|
| | | A11 | A12 | A13 | A14 | A15 | A16 | A17 | A18 | A19 | A20 |
| | Pigment dispersion A11 | | 50 | | | | | | | | |
| | Pigment dispersion A12 | | | 50 | | | | | | | |
| | Pigment dispersion A13 | | | | 50 | | | | | | |
| | Pigment dispersion A14 | | | | | 50 | | | | | |
| | Pigment dispersion A15 | | | | | | 50 | | | | |
| | Pigment dispersion A16 | | | | | | | 50 | | | |
| | Pigment dispersion A17 | | | | | | | | 50 | | |
| | Pigment dispersion A18 | | | | | | | | | 50 | |
| | Pigment dispersion A19 | | | | | | | | | | |
| | Pigment dispersion A20 | | | | | | | | | | |
| | Pigment dispersion A21 | | | | | | | | | | |
| | Pigment dispersion A22 | | | | | | | | | | |
| | Pigment dispersion A23 | | | | | | | | | | |
| | Pigment dispersion A24 | | | | | | | | | | |
| Water-soluble Organic solvent | Glycerin | 10 | 10 | 10 | 10 | 10 | 10 | 10 | 10 | 10 | 10 |
| | 1,3-Butanediol | 20 | 20 | 20 | 20 | 20 | 20 | 20 | 20 | 20 | 20 |
| | Trimethylol propane | | | | | | | | | | |
| | 2-Pyrroridone | | | | | | | | | | |
| Distilled water | | Bal. | Bal. | Bal. | Bal. | Bal. | Bal. | Bal. | Bal. | Bal. | Bal. |
| Total | | 100 | 100 | 100 | 100 | 100 | 100 | 100 | 100 | 100 | 100 |

TABLE A5-3

| | Material name | Example | | | | | | | |
|---|---|---|---|---|---|---|---|---|---|
| | | A21 | A22 | A23 | A24 | A25 | A26 | A27 | A28 |
| Pigment dispersion | Pigment dispersion A1 | | | | | | | | |
| | Pigment dispersion A2 | | | | | | | | |
| | Pigment dispersion A3 | | | | | | | | |
| | Pigment dispersion A4 | | | | | | | | |
| | Pigment dispersion A5 | | | | | | | | |
| | Pigment dispersion A6 | | | | | | | | |
| | Pigment dispersion A7 | | | | | | | | |
| | Pigment dispersion A8 | | | | | | | | |
| | Pigment dispersion A9 | | | | | | | | |
| | Pigment dispersion A10 | | | | | | | | |
| | Pigment dispersion A11 | | | | | | | | |
| | Pigment dispersion A12 | | | | | | | | |
| | Pigment dispersion A13 | | | | | | | | |
| | Pigment dispersion A14 | | | | | | | | |
| | Pigment dispersion A15 | | | | | | | | |

TABLE A5-3-continued

|  | Material name | Example A21 | A22 | A23 | A24 | A25 | A26 | A27 | A28 |
|---|---|---|---|---|---|---|---|---|---|
|  | Pigment dispersion A16 |  |  |  |  |  |  |  |  |
|  | Pigment dispersion A17 |  |  |  |  |  |  |  |  |
|  | Pigment dispersion A18 |  |  |  |  |  |  |  |  |
|  | Pigment dispersion A19 | 50 |  |  |  |  |  |  |  |
|  | Pigment dispersion A20 |  | 50 |  |  |  |  |  |  |
|  | Pigment dispersion A21 |  |  | 50 |  |  |  |  |  |
|  | Pigment dispersion A22 |  |  |  | 50 |  |  |  |  |
|  | Pigment dispersion A23 |  |  |  |  | 50 |  |  |  |
|  | Pigment dispersion A24 |  |  |  |  |  | 50 | 50 | 50 |
| Water-soluble Organic solvent | Glycerin | 10 | 10 | 10 | 10 | 10 | 10 |  | 20 |
|  | 1,3-Butanediol | 20 | 20 | 20 | 20 | 20 | 20 | 30 |  |
|  | Trimethylol propane |  |  |  |  |  |  |  | 5 |
|  | 2-Pyrroridone |  |  |  |  |  |  |  | 5 |
| Distilled water |  | Bal. | Bal. | Bal. | Bal. | Bal. | Bal. | Bal. | Bal. |
| Total |  | 100 | 100 | 100 | 100 | 100 | 100 | 100 | 100 |

TABLE A6-1

|  | Material name | Example A29 | A30 | A31 | A32 | A33 | A34 | A35 | A36 |
|---|---|---|---|---|---|---|---|---|---|
| Pigment dispersion | Pigment dispersion A25 | 50 |  |  |  |  |  |  |  |
|  | Pigment dispersion A26 |  | 30 |  |  |  |  |  |  |
|  | Pigment dispersion A27 |  |  | 50 |  |  |  |  |  |
|  | Pigment dispersion A28 |  |  |  | 30 |  |  |  |  |
|  | Pigment dispersion A29 |  |  |  |  | 50 |  |  |  |
|  | Pigment dispersion A30 |  |  |  |  |  | 50 |  |  |
|  | Pigment dispersion A31 |  |  |  |  |  |  | 50 |  |
|  | Pigment dispersion A32 |  |  |  |  |  |  |  | 50 |
|  | Pigment dispersion A33 |  |  |  |  |  |  |  |  |
|  | Pigment dispersion A34 |  |  |  |  |  |  |  |  |
|  | Pigment dispersion A35 |  |  |  |  |  |  |  |  |
|  | Pigment dispersion A36 |  |  |  |  |  |  |  |  |
|  | Pigment dispersion A37 |  |  |  |  |  |  |  |  |
|  | Pigment dispersion A38 |  |  |  |  |  |  |  |  |
|  | Pigment dispersion A39 |  |  |  |  |  |  |  |  |
|  | Pigment dispersion A40 |  |  |  |  |  |  |  |  |
|  | Pigment dispersion A41 |  |  |  |  |  |  |  |  |
|  | Pigment dispersion A42 |  |  |  |  |  |  |  |  |
|  | Pigment dispersion A43 |  |  |  |  |  |  |  |  |
|  | Pigment dispersion A44 |  |  |  |  |  |  |  |  |
|  | Pigment dispersion A45 |  |  |  |  |  |  |  |  |
|  | Pigment dispersion A46 |  |  |  |  |  |  |  |  |
|  | Pigment dispersion A47 |  |  |  |  |  |  |  |  |
|  | Pigment dispersion A48 |  |  |  |  |  |  |  |  |
|  | Pigment dispersion A49 |  |  |  |  |  |  |  |  |
|  | Pigment dispersion A50 |  |  |  |  |  |  |  |  |
|  | Pigment dispersion A51 |  |  |  |  |  |  |  |  |
|  | Pigment dispersion A52 |  |  |  |  |  |  |  |  |
|  | Pigment dispersion A53 |  |  |  |  |  |  |  |  |
|  | Pigment dispersion A54 |  |  |  |  |  |  |  |  |
|  | Pigment dispersion A55 |  |  |  |  |  |  |  |  |
| Water-soluble Organic solvent | Glycerin | 10 | 10 | 10 | 10 | 10 | 10 | 10 | 10 |
|  | 1,3-Butanediol | 20 | 20 | 20 | 20 | 20 | 20 | 20 | 20 |
|  | Trimethylol propane |  |  |  |  |  |  |  |  |
|  | 2-Pyrroridone |  |  |  |  |  |  |  |  |
| Distilled water |  | Bal. | Bal. | Bal. | Bal. | Bal. | Bal. | Bal. | Bal. |
| Total |  | 100 | 100 | 100 | 100 | 100 | 100 | 100 | 100 |

TABLE A6-2

| | | Example | | | | | | | |
|---|---|---|---|---|---|---|---|---|---|
| | Material name | A37 | A38 | A39 | A40 | A41 | A42 | A43 | A44 |
| Pigment dispersion | Pigment dispersion A25 | | | | | | | | |
| | Pigment dispersion A26 | | | | | | | | |
| | Pigment dispersion A27 | | | | | | | | |
| | Pigment dispersion A28 | | | | | | | | |
| | Pigment dispersion A29 | | | | | | | | |
| | Pigment dispersion A30 | | | | | | | | |
| | Pigment dispersion A31 | | | | | | | | |
| | Pigment dispersion A32 | | | | | | | | |
| | Pigment dispersion A33 | 50 | | | | | | | |
| | Pigment dispersion A34 | | 50 | | | | | | |
| | Pigment dispersion A35 | | | 50 | | | | | |
| | Pigment dispersion A36 | | | | 50 | | | | |
| | Pigment dispersion A37 | | | | | 50 | | | |
| | Pigment dispersion A38 | | | | | | 50 | | |
| | Pigment dispersion A39 | | | | | | | 50 | |
| | Pigment dispersion A40 | | | | | | | | 50 |
| | Pigment dispersion A41 | | | | | | | | |
| | Pigment dispersion A42 | | | | | | | | |
| | Pigment dispersion A43 | | | | | | | | |
| | Pigment dispersion A44 | | | | | | | | |
| | Pigment dispersion A45 | | | | | | | | |
| | Pigment dispersion A46 | | | | | | | | |
| | Pigment dispersion A47 | | | | | | | | |
| | Pigment dispersion A48 | | | | | | | | |
| | Pigment dispersion A49 | | | | | | | | |
| | Pigment dispersion A50 | | | | | | | | |
| | Pigment dispersion A51 | | | | | | | | |
| | Pigment dispersion A52 | | | | | | | | |
| | Pigment dispersion A53 | | | | | | | | |
| | Pigment dispersion A54 | | | | | | | | |
| | Pigment dispersion A55 | | | | | | | | |
| Water-soluble | Glycerin | 10 | 10 | 10 | 10 | 10 | 10 | 10 | 10 |
| Organic | 1,3-Butanediol | 20 | 20 | 20 | 20 | 20 | 20 | 20 | 20 |
| solvent | Trimethylol propane | | | | | | | | |
| | 2-Pyrroridone | | | | | | | | |
| | Distilled water | Bal. | Bal. | Bal. | Bal. | Bal. | Bal. | Bal. | Bal. |
| | Total | 100 | 100 | 100 | 100 | 100 | 100 | 100 | 100 |

TABLE A6-3

| | | Example | | | | | | | |
|---|---|---|---|---|---|---|---|---|---|
| | Material name | A45 | A46 | A47 | A48 | A49 | A50 | A51 | A52 |
| Pigment dispersion | Pigment dispersion A25 | | | | | | | | |
| | Pigment dispersion A26 | | | | | | | | |
| | Pigment dispersion A27 | | | | | | | | |
| | Pigment dispersion A28 | | | | | | | | |
| | Pigment dispersion A29 | | | | | | | | |
| | Pigment dispersion A30 | | | | | | | | |
| | Pigment dispersion A31 | | | | | | | | |
| | Pigment dispersion A32 | | | | | | | | |
| | Pigment dispersion A33 | | | | | | | | |
| | Pigment dispersion A34 | | | | | | | | |
| | Pigment dispersion A35 | | | | | | | | |
| | Pigment dispersion A36 | | | | | | | | |
| | Pigment dispersion A37 | | | | | | | | |
| | Pigment dispersion A38 | | | | | | | | |
| | Pigment dispersion A39 | | | | | | | | |
| | Pigment dispersion A40 | | | | | | | | |
| | Pigment dispersion A41 | 50 | | | | | | | |
| | Pigment dispersion A42 | | 50 | | | | | | |
| | Pigment dispersion A43 | | | 50 | | | | | |
| | Pigment dispersion A44 | | | | 50 | | | | |
| | Pigment dispersion A45 | | | | | 50 | | | |
| | Pigment dispersion A46 | | | | | | 50 | | |

TABLE A6-3-continued

|  | | Example | | | | | | | |
|---|---|---|---|---|---|---|---|---|---|
|  | Material name | A45 | A46 | A47 | A48 | A49 | A50 | A51 | A52 |
|  | Pigment dispersion A47 | | | | | | | 50 | |
|  | Pigment dispersion A48 | | | | | | | | 50 |
|  | Pigment dispersion A49 | | | | | | | | |
|  | Pigment dispersion A50 | | | | | | | | |
|  | Pigment dispersion A51 | | | | | | | | |
|  | Pigment dispersion A52 | | | | | | | | |
|  | Pigment dispersion A53 | | | | | | | | |
|  | Pigment dispersion A54 | | | | | | | | |
|  | Pigment dispersion A55 | | | | | | | | |
| Water-soluble | Glycerin | 10 | 10 | 10 | 10 | 10 | 10 | 10 | 10 |
| Organic | 1,3-Butanediol | 20 | 20 | 20 | 20 | 20 | 20 | 20 | 20 |
| solvent | Trimethylol propane | | | | | | | | |
|  | 2-Pyrroridone | | | | | | | | |
| Distilled water | | Bal. | Bal. | Bal. | Bal. | Bal. | Bal. | Bal. | Bal. |
| Total | | 100 | 100 | 100 | 100 | 100 | 100 | 100 | 100 |

TABLE A6-4

|  | | Example | | | | Comparative Example | | |
|---|---|---|---|---|---|---|---|---|
|  | Material name | A53 | A54 | A55 | A56 | A1 | A2 | A3 |
| Pigment dispersion | Pigment dispersion A25 | | | | | | | |
|  | Pigment dispersion A26 | | | | | | | |
|  | Pigment dispersion A27 | | | | | | | |
|  | Pigment dispersion A28 | | | | | | | |
|  | Pigment dispersion A29 | | | | | | | |
|  | Pigment dispersion A30 | | | | | | | |
|  | Pigment dispersion A31 | | | | | | | |
|  | Pigment dispersion A32 | | | | | | | |
|  | Pigment dispersion A33 | | | | | | | |
|  | Pigment dispersion A34 | | | | | | | |
|  | Pigment dispersion A35 | | | | | | | |
|  | Pigment dispersion A36 | | | | | | | |
|  | Pigment dispersion A37 | | | | | | | |
|  | Pigment dispersion A38 | | | | | | | |
|  | Pigment dispersion A39 | | | | | | | |
|  | Pigment dispersion A40 | | | | | | | |
|  | Pigment dispersion A41 | | | | | | | |
|  | Pigment dispersion A42 | | | | | | | |
|  | Pigment dispersion A43 | | | | | | | |
|  | Pigment dispersion A44 | | | | | | | |
|  | Pigment dispersion A45 | | | | | | | |
|  | Pigment dispersion A46 | | | | | | | |
|  | Pigment dispersion A47 | | | | | | | |
|  | Pigment dispersion A48 | | | | | | | |
|  | Pigment dispersion A49 | 50 | | | | | | |
|  | Pigment dispersion A50 | | | | | 50 | | |
|  | Pigment dispersion A51 | | | | | | 50 | |
|  | Pigment dispersion A52 | | | | | | | 50 |
|  | Pigment dispersion A53 | | 50 | | | | | |
|  | Pigment dispersion A54 | | | 50 | | | | |
|  | Pigment dispersion A55 | | | | 50 | | | |

TABLE A6-4-continued

|  | | Example | | | | Comparative Example | | |
|---|---|---|---|---|---|---|---|---|
| | Material name | A53 | A54 | A55 | A56 | A1 | A2 | A3 |
| Water-soluble Organic solvent | Glycerin | 10 | 10 | 10 | 10 | 10 | 10 | 10 |
| | 1,3-Butanediol | 20 | 20 | 20 | 20 | 20 | 20 | 20 |
| | Trimethylol propane | | | | | | | |
| | 2-Pyrroridone | | | | | | | |
| Distilled water | | Bal. | Bal. | Bal. | Bal. | Bal. | Bal. | Bal. |
| Total | | 100 | 100 | 100 | 100 | 100 | 100 | 100 |

The Pigment dispersions A1 to A55, and inks of Examples A1 to A56, and Comparative Examples A1 to A3 were evaluated for viscosity and storage stability in the same manner as in Pigment dispersions 1 to 30, and inks of Examples 1 to 29, and Comparative Examples 1 to 3. Additionally, the inks also evaluated for image density. Results are shown in Tables A7-1 to A7-3.

TABLE A7-1

| | | | | Pigment dispersion | | Ink | | |
|---|---|---|---|---|---|---|---|---|
| | Copolymer | *1 | Mw | Initial viscosity | Storage stability | Initial viscosity | Storage stability | Image density |
| Ex. A1 | Copolymer 3 | 30 | 30,000 | A | B | B | B | A |
| Ex. A2 | Copolymer 3 | 30 | 30,000 | A | A | B | B | A |
| Ex. A3 | Copolymer 3 | 30 | 30,000 | A | A | B | B | A |
| Ex. A4 | Copolymer 3 | 30 | 30,000 | A | A | B | B | A |
| Ex. A5 | Copolymer 3 | 30 | 30,000 | B | A | B | B | A |
| Ex. A6 | Copolymer 3 | 30 | 30,000 | A | A | B | B | A |
| Ex. A7 | Copolymer 3 | 30 | 30,000 | A | A | B | B | A |
| Ex. A8 | Copolymer 3 | 30 | 30,000 | A | A | B | B | A |
| Ex. A9 | Copolymer 1 | 15 | 3,000 | A | A | B | B | B |
| Ex. A10 | Copolymer 2 | 5 | 7,000 | A | A | B | B | B |
| Ex. A11 | Copolymer 4 | 55 | 3,000 | A | A | B | B | B |
| Ex. A12 | Copolymer 5 | 65 | 7,000 | B | A | B | B | A |
| Ex. A13 | Copolymer 6 | 30 | 7,000 | A | A | B | B | A |
| Ex. A14 | Copolymer 7 | 55 | 60,000 | B | A | B | B | A |
| Ex. A15 | Copolymer 8 | 65 | 45,000 | A | B | B | B | A |
| Ex. A16 | Copolymer 9 | 55 | 45,000 | A | A | B | B | A |
| Ex. A17 | Copolymer 10 | 15 | 60,000 | A | B | B | B | A |
| Ex. A18 | Copolymer 11 | 5 | 45,000 | A | A | B | B | B |
| Ex. A19 | Copolymer 12 | 15 | 45,000 | A | A | B | B | A |
| Ex. A20 | Copolymer 13 | 15 | 7,000 | B | A | A | A | A |
| Ex. A21 | Copolymer 14 | 15 | 7,000 | B | A | A | A | A |
| Ex. A22 | Copolymer 15 | 5 | 3,000 | B | B | B | B | B |

TABLE A7-1-continued

|  | Copolymer | *1 | Mw | Pigment dispersion Initial viscosity | Pigment dispersion Storage stability | Ink Initial viscosity | Ink Storage stability | Image density |
|---|---|---|---|---|---|---|---|---|
| Ex. A23 | Copolymer 16 | 65 | 60,000 | B | B | B | B | A |
| Ex. A24 | Copolymer 17 | 15 | 7,000 | A | A | B | B | A |

TABLE A7-2

|  | Copolymer | *1 | Mw | Pigment dispersion Initial viscosity | Pigment dispersion Storage stability | Ink Initial viscosity | Ink Storage stability | Image density |
|---|---|---|---|---|---|---|---|---|
| Ex. A25 | Copolymer 20 | 15 | 7,000 | A | B | B | B | A |
| Ex. A26 | Copolymer 20 | 15 | 7,000 | A | A | B | B | A |
| Ex. A27 | Copolymer 20 | 15 | 7,000 | A | A | B | B | A |
| Ex. A28 | Copolymer 20 | 15 | 7,000 | A | A | B | B | A |
| Ex. A29 | Copolymer 20 | 15 | 7,000 | B | A | B | A | A |
| Ex. A30 | Copolymer 20 | 15 | 7,000 | A | A | B | B | A |
| Ex. A31 | Copolymer 20 | 15 | 7,000 | A | A | B | B | A |
| Ex. A32 | Copolymer 20 | 15 | 7,000 | A | A | B | B | A |
| Ex. A33 | Copolymer 18 | 15 | 3,000 | A | A | B | B | B |
| Ex. A34 | Copolymer 19 | 5 | 7,000 | A | A | B | B | B |
| Ex. A35 | Copolymer 21 | 55 | 3,000 | A | A | B | B | B |
| Ex. A36 | Copolymer 22 | 65 | 7,000 | B | A | B | B | A |
| Ex. A37 | Copolymer 23 | 55 | 7,000 | A | A | B | B | A |
| Ex. A38 | Copolymer 24 | 55 | 60,000 | B | A | B | B | A |
| Ex. A39 | Copolymer 25 | 65 | 45,000 | A | B | B | B | A |
| Ex. A40 | Copolymer 26 | 55 | 45,000 | A | A | B | B | A |
| Ex. A41 | Copolymer 27 | 15 | 60,000 | A | B | B | B | A |
| Ex. A42 | Copolymer 28 | 5 | 45,000 | A | A | B | B | B |
| Ex. A43 | Copolymer 29 | 15 | 45,000 | A | A | B | B | A |
| Ex. A44 | Copolymer 30 | 15 | 7,000 | B | A | A | A | A |
| Ex. A45 | Copolymer 31 | 15 | 7,000 | B | A | A | A | A |
| Ex. A46 | Copolymer 32 | 5 | 3,000 | B | B | B | B | B |
| Ex. A47 | Copolymer 33 | 65 | 60,000 | B | B | B | B | A |
| Ex. A48 | Copolymer 34 | 30 | 30,000 | A | A | B | B | A |

TABLE A7-3

| | Copolymer | *1 | Mw | Pigment dispersion | | Ink | | |
| --- | --- | --- | --- | --- | --- | --- | --- | --- |
| | | | | Initial viscosity | Storage stability | Initial viscosity | Storage stability | Image density |
| Ex. A49 | Copolymer 35 | 30 | 30,000 | A | A | B | B | A |
| Ex. A50 | Copolymer 36 | 30 | 30,000 | A | A | B | B | A |
| Ex. A51 | Copolymer 37 | 30 | 30,000 | A | A | B | B | A |
| Ex. A52 | Copolymer 38 | 30 | 30,000 | A | A | B | B | A |
| Ex. A53 | Copolymer 39 | 15 | 7,000 | B | A | A | A | A |
| Ex. A54 | Copolymer 43 | 30 | 30,000 | B | A | B | B | A |
| Ex. A55 | Copolymer 44 | 30 | 30,000 | B | A | B | B | A |
| Ex. A56 | Copolymer 45 | 30 | 30,000 | B | A | B | B | A |
| Comp. Ex. A1 | Copolymer 40 | (15) | 7,000 | B | C | B | C | E |
| Comp. Ex. A2 | Copolymer 41 | 15 | 7,000 | C | E | C | E | B |
| Comp. Ex. A3 | Copolymer 42 | (15) | 10,000 | B | E | B | E | E |

In Tables A7-1 and A7-3, *1 denotes "(Formula 1) structural unit content (%)" which means a percentage of the structural unit represented by the General Formula (1) in the phosphate group-containing copolymer, and Mw denotes the mass average molecular weight.

As can be seen from Tables A7-1 and A7-3, when comparing Examples A1 to A56 with Comparative Examples A1 to A3, inks which contain a phosphate group-containing copolymer of the present invention are more excellent in both of image density and storage stability.

Additionally, it can be seen that Examples in which the structural unit represented by the General Formula (1) is contained in a percentage of 10% by mass to 60% by mass are more excellent in both of image density and storage stability than other Examples.

It can be seen that Examples in which the copolymer has a molecular weight of 5,000 to 50,000 are more excellent in both of image density and storage stability than other Examples.

Embodiments of the present invention are as follows.
<1> An inkjet recording ink, including:
water;
a water-soluble organic solvent;
a pigment; and
a phosphate group-containing copolymer,
wherein the phosphate group-containing copolymer contains a structural unit represented by the following General Formula (1) and a structural unit represented by the following General Formula (2):

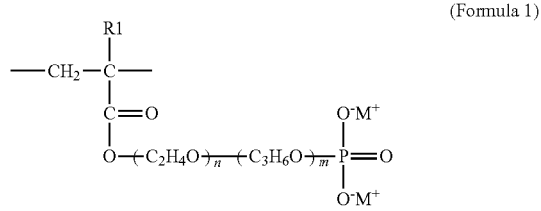

(Formula 1)

where R1 denotes a hydrogen atom or a methyl group; $M^+$ denotes an alkali metal ion, an organic amine ion, or a hydrogen ion; half or more of $M^+$ in the copolymer is the alkali metal ion or the organic amine ion, the remainder of $M^+$ is the hydrogen ion; n and m each denote an integer of 0 to 6, provided that both of n and m are not 0; and a block of $(C_2H_4O)$ and a block of $(C_3H_6O)$ may be exchanged with each other,

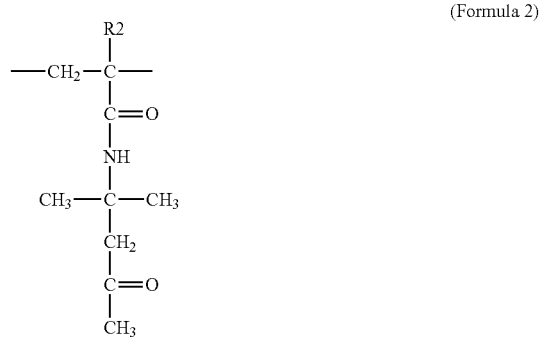

(Formula 2)

where R2 denotes a hydrogen atom or a methyl group.
<2> The inkjet recording ink according to <1>, wherein the phosphate group-containing copolymer further contains a structural unit represented by the following General Formula (3), a structural unit represented by the following General Formula (4), or both thereof:

(Formula 3)

where R3 denotes a hydrogen atom or a methyl group,

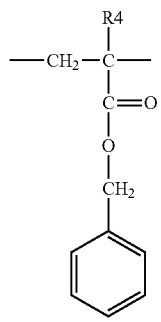

(Formula 4)

where R4 denotes a hydrogen atom or a methyl group.

<3> The inkjet recording ink according to <1> or <2>, wherein the structural unit represented by the General Formula (1) is contained in the phosphate group-containing copolymer in a percentage of 10% by mass to 60% by mass.

<4> The inkjet recording ink according to any one of <1> to <3>, wherein the phosphate group-containing copolymer has a weight average molecular weight of 5,000 to 50,000.

<5> The inkjet recording ink according to any one of <1> to <4>, wherein the phosphate group-containing copolymer is synthesized by allowing a monomer represented by the following General Formula (5) to polymerize with a monomer represented by the following General Formula (6), followed by neutralizing with an alkali metal salt or an organic amine base:

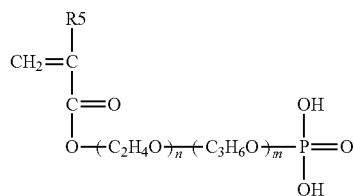

(Formula 5)

where R5 denotes a hydrogen atom or a methyl group, and n and m each denote an integer of 0 to 6, provided that both of n and m are not 0,

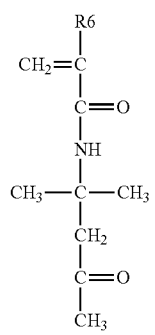

(Formula 6)

where R6 denotes a hydrogen atom or a methyl group.

<6> The inkjet recording ink according to <5>, wherein the phosphate group containing copolymer is allowed to further polymerize with a monomer represented by the following General Formula (7), a monomer represented by the following General Formula (8), or both thereof:

(Formula 7)

where R7 denotes a hydrogen atom or a methyl group,

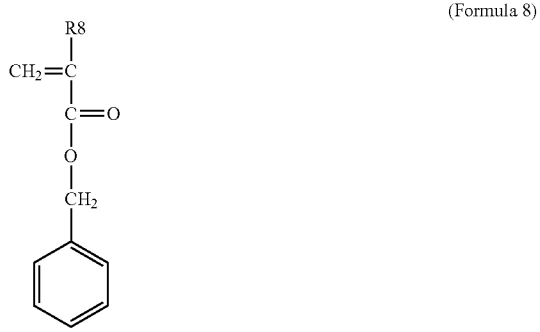

(Formula 8)

where R8 denotes a hydrogen atom or a methyl group.

<7> An ink cartridge, including:
a container; and
the inkjet recording ink according to any one of <1> to <6> contained in the container.

<8> An inkjet recording device, including:
the ink cartridge according to <7>.

<9> An inkjet recording method, including:
applying a stimulus to the inkjet recording ink according to any one of <1> to <6> to allow the inkjet recording ink to jet, to thereby record an image.

<10> An ink recorded matter, including:
a recording medium; and
an image recorded on the recording medium with the inkjet recording ink according to any one of <1> to <6>.

REFERENCE SIGNS LIST

101 Device Main Body
102 Paper Feeding Tray
103 Paper Discharging Tray
104 Ink Cartridge Loading Section
105 Control Section
111 Head Cover
112 Front Surface of Front Cover
115 Front Cover
131 Guide Rod
132 Stay
133 Carriage
134 Recording Head
135 Sub-Tank
141 Paper Loading Section
142 Sheet of Paper
143 Paper Feeding Roller
144 Separation Pad 145 Guide
151 Conveyance Belt
152 Counter Roller
153 Conveyance Guide
154 Pressing Member
155 Pressurizing Roller
156 Charging Roller
157 Conveyance Roller
158 Tension Roller
161 Guide Member
171 Separation Claw
172 Paper Discharge Roller
173 Paper Discharge Roller
181 Double-Sided Paper Feeding Unit
182 Manual Paper Feeding Section
200 Ink Cartridge
241 Ink Bag
242 Ink Inlet
243 Ink Outlet
244 Cartridge Case

The invention claimed is:

1. An inkjet recording ink, comprising:
water;
a water-soluble organic solvent;
a pigment; and
a phosphate group-containing copolymer,
wherein the phosphate group-containing copolymer comprises a structural unit represented by the following General Formula (1) and a structural unit represented by the following General Formula (2):

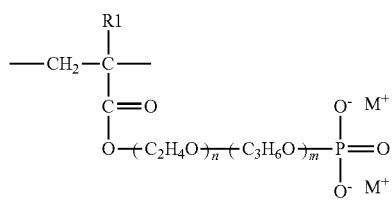

(Formula 1)

where R1 denotes a hydrogen atom or a methyl group; $M^+$ denotes an alkali metal ion, an organic amine ion, or a hydrogen ion; half or more of $M^+$ in the copolymer is the alkali metal ion or the organic amine ion, the remainder of $M^+$ is the hydrogen ion; n and m each denote an integer of 0 to 6, provided that both of n and m are not 0; and a block of $(C_2H_4O)$ and a block of $(C_3H_6O)$ may be exchanged with each other,

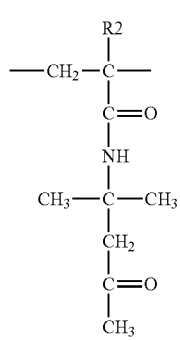

(Formula 2)

where R2 denotes a hydrogen atom or a methyl group,
wherein the structural unit represented by the General Formula (1) is contained in the phosphate group-containing copolymer in a percentage of 10% by mass to 60% by mass relative to the mass of the phosphate group-containing copolymer.

2. The inkjet recording ink according to claim 1, wherein the phosphate group-containing copolymer further comprises a structural unit represented by the following General Formula (3), a structural unit represented by the following General Formula (4), or both thereof:

(Formula 3)

where R3 denotes a hydrogen atom or a methyl group,

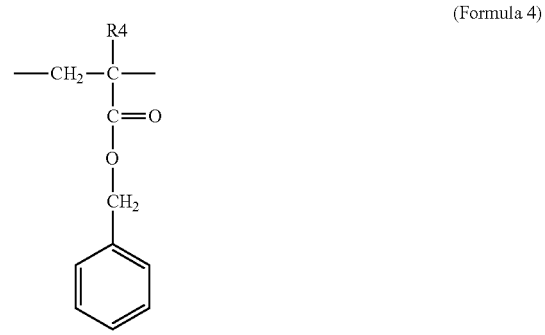

(Formula 4)

where R4 denotes a hydrogen atom or a methyl group.

3. The inkjet recording ink according to claim 1, wherein the phosphate group-containing copolymer has a weight average molecular weight of 5,000 to 50,000.

4. The inkjet recording ink according to claim 1, wherein the phosphate group-containing copolymer is synthesized by allowing a monomer represented by the following General Formula (5) to polymerize with a monomer represented by the following General Formula (6), followed by neutralizing with an alkali metal salt or an organic amine base:

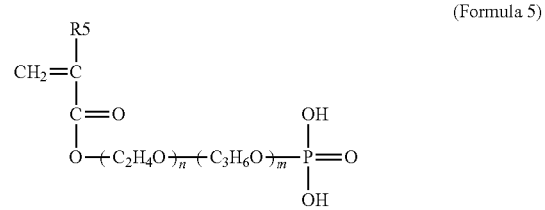

(Formula 5)

where R5 denotes a hydrogen atom or a methyl group, and n and m each denote an integer of 0 to 6, provided that both of n and m are not 0,

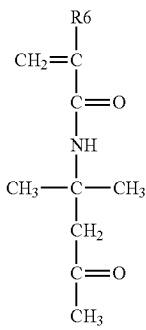

(Formula 6)

where R6 denotes a hydrogen atom or a methyl group.

5. The inkjet recording ink according to claim 4, wherein the phosphate group-containing copolymer is allowed to further polymerize with a monomer represented by the following General Formula (7), a monomer represented by the following General Formula (8), or both thereof:

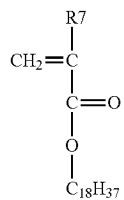

(Formula 7)

where R7 denotes a hydrogen atom or a methyl group,

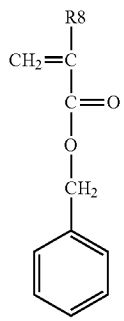

(Formula 8)

where R8 denotes a hydrogen atom or a methyl group.

6. An ink cartridge, comprising:
a container; and
the inkjet recording ink according to claim 1 contained in the container.

7. An inkjet recording device, comprising:
the ink cartridge according to claim 6.

8. An inkjet recording method, comprising:
applying a stimulus to the inkjet recording ink according to claim 1 to allow the inkjet recording ink to jet, to thereby record an image.

9. An ink recorded matter, comprising:
a recording medium; and
an image recorded with the inkjet recording ink according to claim 1.

* * * * *

UNITED STATES PATENT AND TRADEMARK OFFICE
CERTIFICATE OF CORRECTION

PATENT NO. : 9,752,037 B2  
APPLICATION NO. : 14/766836  
DATED : September 5, 2017  
INVENTOR(S) : Minoru Hakiri et al.

Page 1 of 1

It is certified that error appears in the above-identified patent and that said Letters Patent is hereby corrected as shown below:

On the Title Page

Item (73), the Assignees' information is incorrect. Item (73) should read:  
--(73) Assignees: Ricoh Company, Ltd., Tokyo (JP)  
               GOO CHEMICAL CO., LTD., Kyoto (JP)--

Signed and Sealed this  
First Day of May, 2018

Andrei Iancu  
*Director of the United States Patent and Trademark Office*